US012076840B2

(12) United States Patent
Chung et al.

(10) Patent No.: US 12,076,840 B2
(45) Date of Patent: Sep. 3, 2024

(54) POWER TOOL FOR REVERSING AND HOLDING WITH SINGLE HAND

(71) Applicant: TECHWAY INDUSTRIAL CO., LTD., Taichung (TW)

(72) Inventors: Fu-Hsiang Chung, Taichung (TW); Wei-Ting Chen, Taichung (TW); Zong Hua Li, Taichung (TW); Kai Chien Yang, Taichung (TW)

(73) Assignee: TECHWAY INDUSTRIAL CO., LTD., Taichung (TW)

( * ) Notice: Subject to any disclaimer, the term of this patent is extended or adjusted under 35 U.S.C. 154(b) by 22 days.

(21) Appl. No.: 17/826,813

(22) Filed: May 27, 2022

(65) Prior Publication Data

US 2022/0388131 A1 Dec. 8, 2022

(30) Foreign Application Priority Data

Jun. 3, 2021 (TW) ................................ 110120306
Jan. 18, 2022 (TW) ................................ 111102081

(51) Int. Cl.
*B25B 13/46* (2006.01)
*B25B 21/00* (2006.01)

(52) U.S. Cl.
CPC .................................. *B25B 21/004* (2013.01)

(58) Field of Classification Search
CPC ............................ B25B 13/463; B25B 21/004
USPC ................................................ 81/62; 173/47
See application file for complete search history.

(56) References Cited

U.S. PATENT DOCUMENTS 5,535,646 A * 7/1996 Allen .................... B25B 21/004 81/57.39
9,381,625 B2 * 7/2016 Chen ....................... B25B 21/00
9,579,778 B2 * 2/2017 Hsieh .................. B25B 23/1425
11,413,731 B2 * 8/2022 Banholzer ............. B25B 21/004
11,691,253 B2 * 7/2023 Banholzer ............. B25B 21/004 81/57.39
11,691,254 B2 * 7/2023 Nick ..................... B25B 21/004 81/57.39

(Continued)

FOREIGN PATENT DOCUMENTS

TW I650205 2/2019
TW I661909 6/2019
TW M590506 2/2020

*Primary Examiner* — Thanh K Truong
*Assistant Examiner* — Patrick B Fry
(74) *Attorney, Agent, or Firm* — Guice Patents PLLC

(57) ABSTRACT

The invention relates to a power tool that can be held with one hand for reversing, comprising: a casing having a grip part and a manipulation port; a driving device having a control member; the control member is capable of controlling an actuation direction of the driving device; a power source disposed below the driving device and capable of driving the driving device; a reversing assembly disposed at a periphery of the power source and having a reversing member; the reversing member controls the control member to generate changes of displacement, a driving direction of the driving device is changed by action of turning the reversing assembly that is away from the driving device, and there is an appropriate manipulating distance between the grip part and the manipulation port, so that a user is capable of manipulating by holding and reversing the power tool with one hand at a same position.

5 Claims, 21 Drawing Sheets

(56) References Cited

U.S. PATENT DOCUMENTS

| | | | | |
|---|---|---|---|---|
| 2005/0257647 | A1 * | 11/2005 | Baker | B25B 21/004 81/57.39 |
| 2020/0061782 | A1 * | 2/2020 | Banholzer | B25B 13/465 |
| 2022/0355459 | A1 * | 11/2022 | Beer | B25B 21/004 |

* cited by examiner

POWER TOOL FOR REVERSING AND HOLDING WITH SINGLE HAND

BACKGROUND OF THE INVENTION

Field of Invention

The invention is related to power tools, and more particularly to a power tool with a reversing assembly disposed near a grip part, and can be easily manipulated and held for reversing with one hand.

Related Art

Ratchet wrench is a commonly used hand tool. In order to be able to apply force to manipulate at a narrow angle, a ratchet structure is used inside the ratchet wrench, such as in the structure of the Taiwan patent "1650205", the wrench is composed of the ratchet structure and the toggle device disposed around the periphery of the ratchet structure. By switching a position of the toggle device, a rotation direction of the ratchet structure is changed to rotate a workpiece. However, because the toggle device is too close to the ratchet structure, in manipulation, it is required to make the wrench leave the original manipulating position, and the other hand needs to move to be near the ratchet structure to switch the direction, so as to change the rotation direction of the ratchet wheel. As shown in FIG. 1, in order to change a position of reversing in manipulation, a conventional manual reversing ratchet wrench 10 changes a direction in which a force can be applied to manipulate mainly by changing a rotation direction of the ratchet wheel, the ratchet wrench 10 is provided a ratchet structure 11 composed of: the ratchet wheel 111, a latching tooth 112, and a control member 113, the ratchet wheel 111 is provided with latching teeth around a circumference, the latching tooth 112 can be correspondingly meshed with an outer surface of the ratchet wheel 111, the ratchet wheel 111 can be rotated in different directions through engagement of the latching tooth 112 on the ratchet wheel 111 in different directions to rotate a workpiece; the control member 113 is elastically abutted on the latching tooth 112, the latching tooth 112 can be driven to switch directions, one end of a lever 12 is connected to the control member 113 to drive the control member 113, another end of the lever 12 is disposed at a handle of the ratchet wrench 10, and reversing actions of the control member 113 are performed through reciprocating switching of the lever 12 at the handle position.

In addition, please refer to FIG. 2, which is an electrically driven ratchet wrench, the latching tooth 112 is disposed on an outer side of the ratchet wheel 111, the control member 113 is correspondingly disposed inside the ratchet wheel 111, a direction in which the ratchet wheel 111 is actuated is adjusted through switching directions of the control member 113. In addition, in the Taiwan patent "M590506" or "1661909", a reverse switching device is disposed on an outer circumference of the ratchet wrench 10, and a manipulating position of the control member 113 is remotely driven to change by means of rotation in order to adjust a position of the latching tooth 112.

The conventional ratchet structure, whether it is a manual ratchet wrench or an electric ratchet wrench, requires the manipulator to move the wrench away from a manipulating position and move the other hand to be near the ratchet structure 11 to switch the control member 113 or the lever 12 in order to switch an actuation direction of the ratchet wheel 111.

However, although the lever 12 in FIG. 1 is disposed close to the handle, there is still a certain distance from a hand holding position, its manipulating distance does not conform to the ideal ergonomic distance, and it is required to push the lever 12 to move back and forth when the control member 113 needs to be switched. In a state of holding with one hand, it is not easy to use the fingers of the same hand to apply force to perform switching action, so in the process of switching, the ratchet wrench 10 still needs to be held with one hand and use the other hand to perform switching action of the lever 12. When a position of the lever 12 is pushed back and forth, a space required for the lever 12 to move therein is large, which is easy for dust to enter, resulting in formation of an obstacle to stuck at a position where the lever 12 actuates, causing obstruction when switching. During the process of manipulation, tools or the user's hands are often contaminated with foreign objects such as oil stains, and therefore the user will be affected by the oil stains during pushing and it is difficult to apply force. In addition, the manual ratchet wrench 10 needs to be turned by the hand to apply force to rotate, which requires a large manipulating space. In addition, in the ratchet structure 11 of FIG. 2, because the control member 113 is disposed inside the ratchet wheel 111, during the switching process of the control member 113, the user needs to use one hand to hold the electric ratchet wrench 10, and use the other idle hand to manipulate the control member 113 to perform the reversing action. During the reversing action, the tool (i.e., the ratchet wrench 10) needs to be removed from the manipulating position first, if the tool is used in a work area that is relatively narrow or difficult to reach inside, and the tool is removed to switch direction and then placed back in the work area, it will take a considerable amount of time and cause inconvenience in manipulation. Furthermore, because the control member 113 needs to be switched by hand, the user is required to remove the ratchet wrench 10 and then perform the reversing action with the other idle hand, which will reduce the use efficiency during the switching process. In addition, when the ratchet wrench 10 in FIG. 2 is manipulated, because the control member 113 will rotate in position with the teeth movement of the ratchet wheel 111, the user cannot determine the current manipulation direction, it is often required to alternately rotate the control member 113 from left to right to be able to determine, thus it is quite inconvenient to use. In addition, in the structures of the Taiwan patent "M590506" or "1661909", even though a position of the reverse switching device is not at the head position, it is still quite close to the ratchet structure or near the head, so when switching position, the user also needs to remove the ratchet wrench from the original manipulating position before manipulating again, and because the reverse switching device is still quite close to the ratchet structure or the head, the user is prone to contact with unintentionally when moving or manipulating, causing the ratchet wrench to rotate in an opposite direction, and causing troubles in manipulation. In addition, the reverse switching structure also needs to be held with one hand and the other hand is required to perform rotating action when performing rotation for switching and controlling a position of the control member 113 in order to produce relative rotation, and therefore it is required to use both hands at the same time during manipulation in order to achieve the reversing manipulation, which is inconvenient in manipulation, and position switching is not ergonomic.

SUMMARY OF THE INVENTION

A object of the invention is to provide a power tool for reversing and holding by single hand, which is convenient to switch a rotation direction of the power tool with one hand, and is easy to manipulate without moving the hand form the power tool and a manipulation position of the power tool.

Another object of the invention is to provide a power tool for reversing and holding by single hand, a reversing assembly thereof is disposed at a position away from a ratchet mechanism or close to a position where the hand holds on, so that a rotation direction of a working head of a driving device can be switched directly with one hand.

In order to achieve the above objects, the invention provides a power tool for reversing and holding with single hand, comprising:

- a casing provided with an accommodating space therein, a grip part is disposed at a bottom of the casing; a manipulation port is formed by penetrating the casing; a single-handedly holding length is formed between a bottom of the grip part and the manipulation port, the single-handedly holding length is between 100-160 mm;
- a driving device accommodated in the accommodating space of the casing; comprising a working head and a control unit; the control unit has a control member; the control member is capable of changing a position to control the working head to rotate in different directions;
- a power source disposed in the accommodating space of the casing and below the driving device to be capable of driving the working head to actuate; and
- a reversing assembly disposed in the manipulation port of the casing and capable of generating a change in rotational position of the working head.

In the power tool for reversing and holding with single hand provided by the invention, with the reversing assembly disposing at a position of the manipulation port disposed above the grip part, control of manipulating direction can be performed at a position away from the driving device without requiring to be close to the driving device for switching, switching action is carried out through the reversing member, in addition to maintaining an original hand holding action, it is not required to change gesture or holding position, manipulation is simple, a user is capable of switching working direction without requiring to move a position of the power tool, and a direction can also be directly reversed during a process of manipulation, thereby improving a work efficiency, and the reversing assembly is away from the driving device, it is not easy to unintentionally contact with other components to cause malfunctions.

BRIEF DESCRIPTION OF THE DRAWINGS

In order to further understand the objects, technical features and efficacies of the invention, eight preferred embodiments will be exemplified in detail hereinafter with reference to the accompanying drawings, wherein.

DETAILED DESCRIPTION OF THE INVENTION

Figure 1:
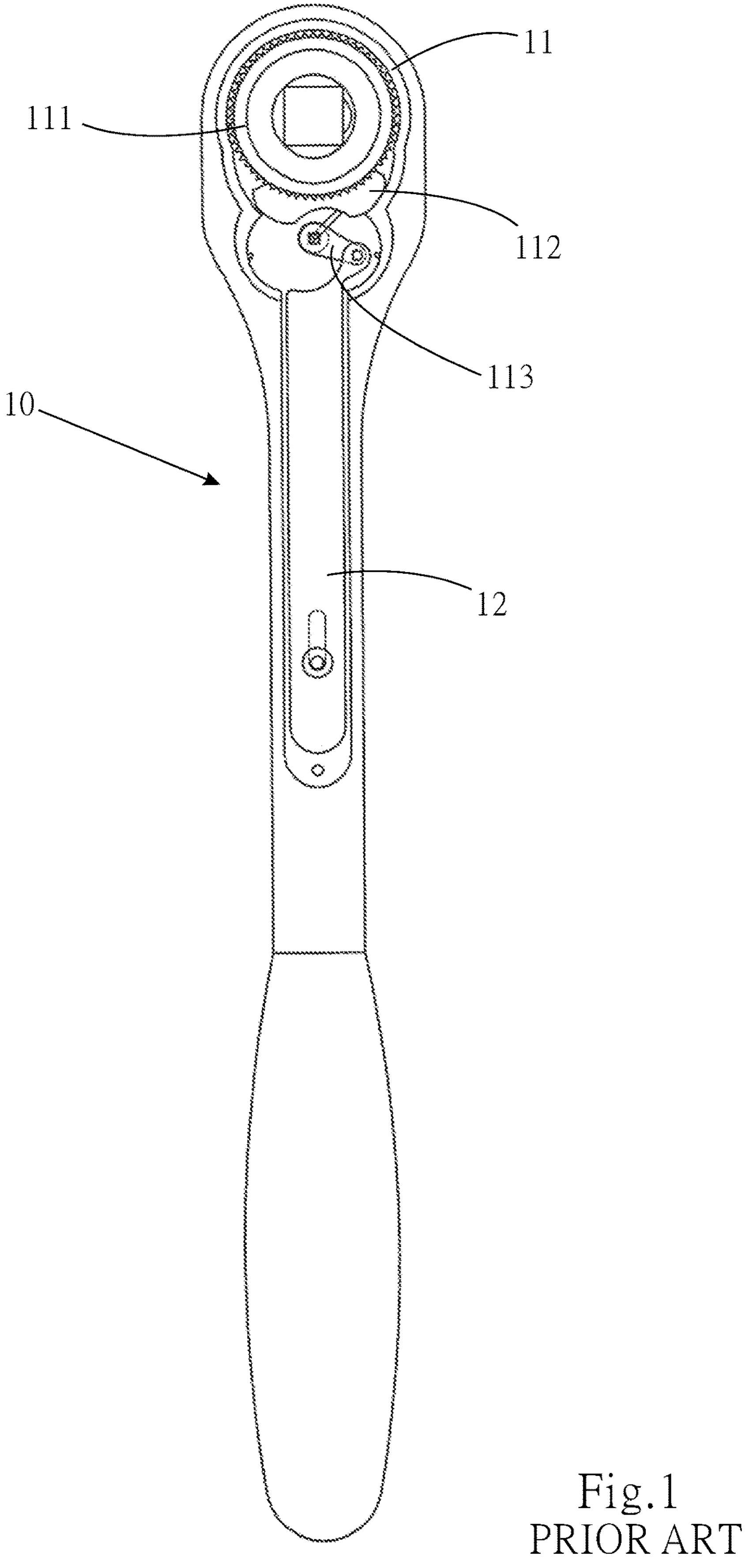
Fig.1 PRIOR ART
FIG. 1 is a schematic diagram of a conventional ratchet wrench.
Figure 2:
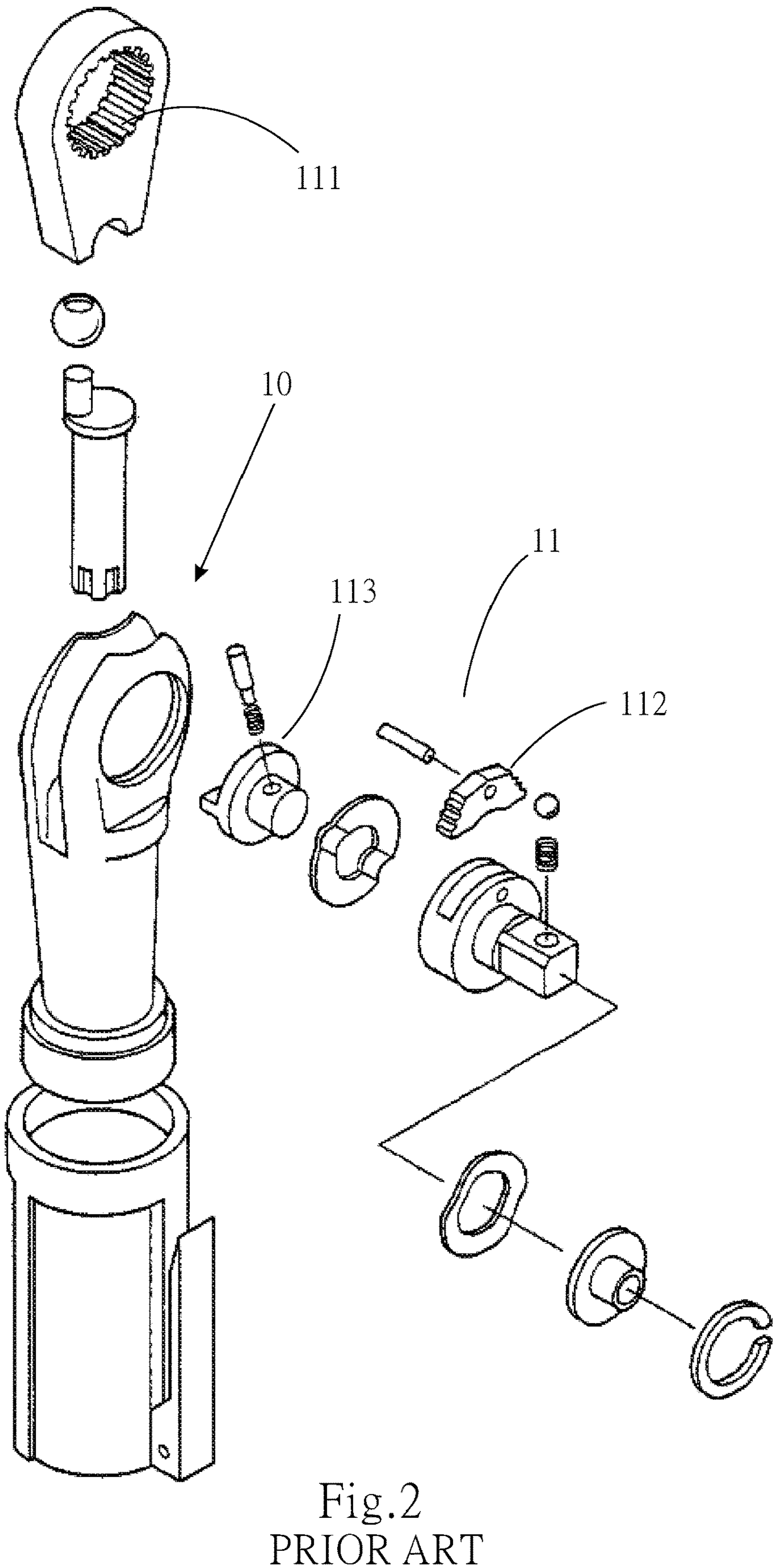
Fig.2 PRIOR ART
FIG. 2 is an exploded perspective view of another conventional ratchet wrench.
Figure 3:
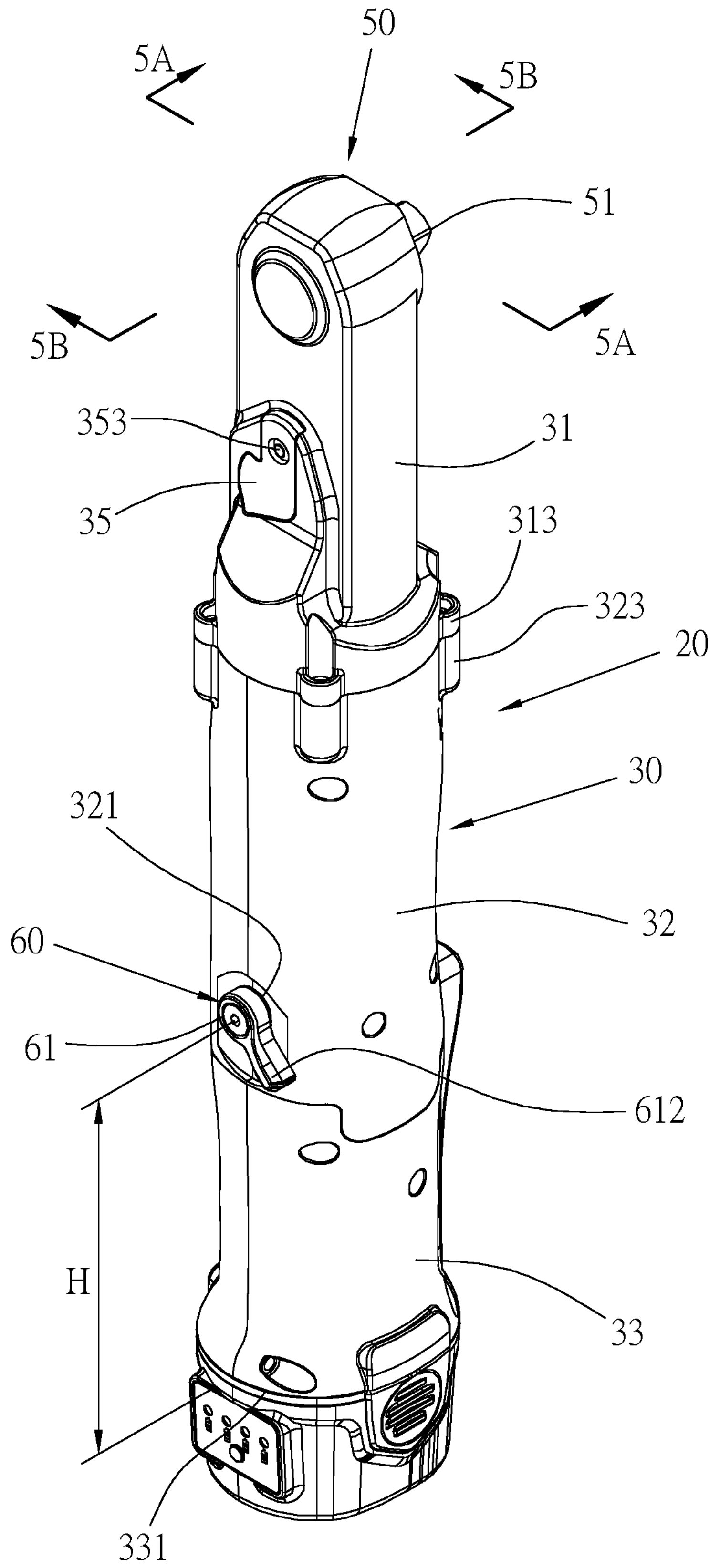
FIG. 3 is a perspective view of a power tool according to a first preferred embodiment of the invention.
Figure 4:
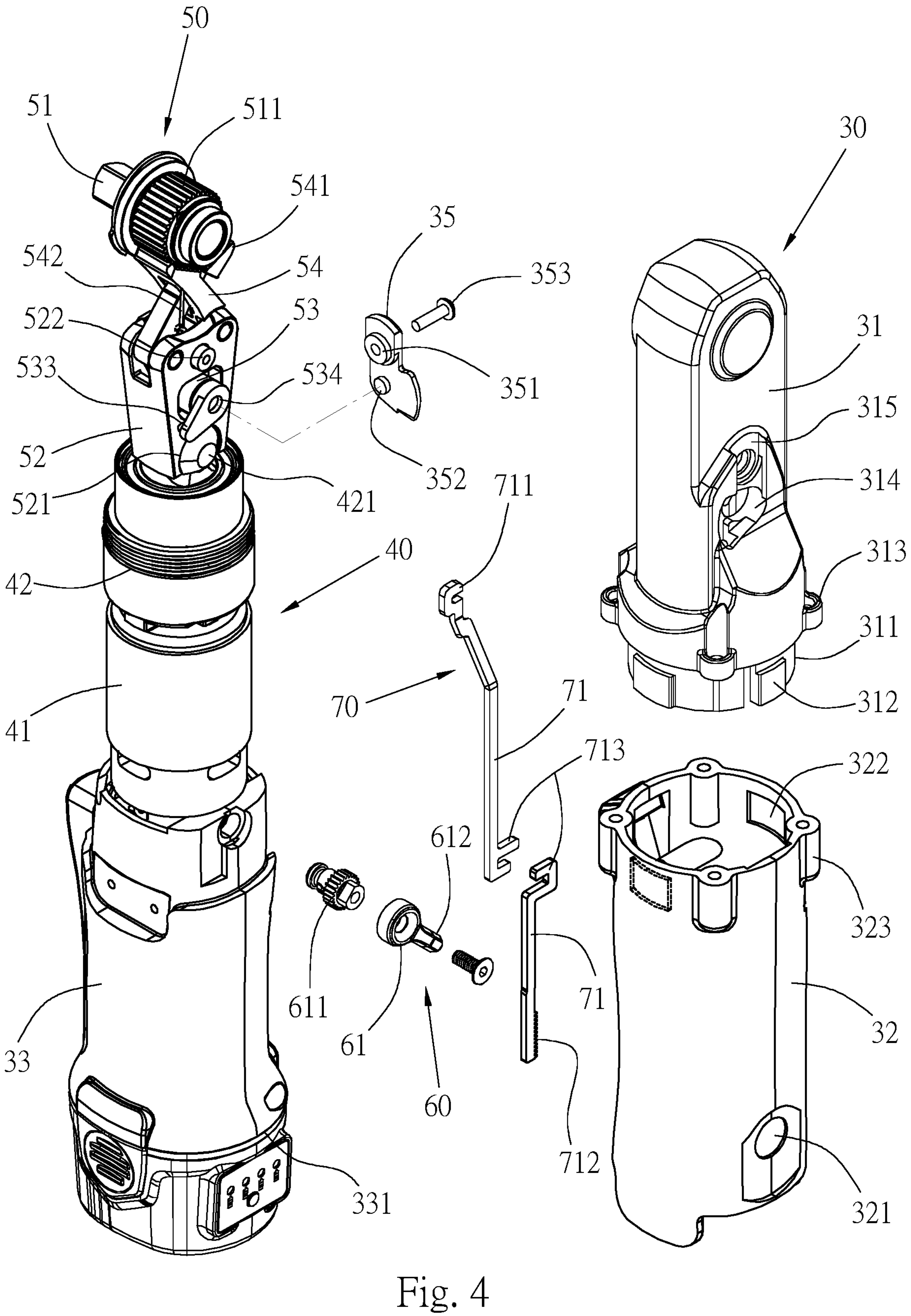
FIG. 4 is an exploded view of interior of the power tool according to the first preferred embodiment of the invention.

Please refer to FIGS. 3 to 5, which are a power tool 20 provided in a first preferred embodiment of the invention, comprising a casing 30, a power source 40, a driving device 50, a reversing assembly 60, and a linkage member 70.

The casing 30 has an upper casing 31, a lower casing 32, a grip part 33 and an end cover 35; a bottom of the upper casing 31 is provided with a plug-connected part 311, and the plug-connected part 311 is provided with four positioning blocks 312 thereon. The upper casing 31 is annularly provided with four first assembling holes 313 above the plug-connected part 311, a maintenance hole 314 is recessed on one side of the upper casing 31, and a positioning hole 315 is provided at an upper end in the maintenance hole 314. One side of the lower casing 32 has a circular manipulation port 321, an inner side of a top end of the lower casing 32 is recessed with four positioning grooves 322 corresponding to the positioning blocks 312, and four second assembling holes 323 are provided on an outer side of the top end of the lower casing 32. The upper casing 31 and the lower casing 32 are butt jointed, when butting, the plug-connected part 311 will be inserted into the lower casing 32, and the positioning blocks 312 will be elastically snapped into the positioning grooves 322. At the same time, the first assembling holes 313 are aligned with the second assembling holes 323, and a bolt or other fixing element is used to fix the first assembling holes 313 and the second assembling holes 323 to ensure that a connection position between the upper casing 31 and the lower casing 32 is proper, so that the components in the casing 30 can be assembled in correct positions in order to improve assembly accuracy and yield. A bottom of the lower casing 32 is provided with the grip part 33, the manipulation port 321 is located above the grip part 33, a single-handedly holding length H is formed between a bottom 331 of the grip part 33 and a central position of the manipulation port 321, the length H is between 100 mm and 160 mm, a most suitable length is 120 mm-140 mm, and an optimum length is 130 mm. A battery is connected under the grip part 33. The end cover 35 is covered in the maintenance hole 314 of the upper casing 31, and a positioning part 351 is disposed on the end cover 35 to be correspondingly embedded in the positioning hole 315. In addition, the end cover 35 is protruded with a circular column 352 below the positioning part 351, and a screw member 353 is inserted into the positioning part 351.

Please refer to FIG. 4, the power source 40 is partially located in the upper casing 31 and partially located in the lower casing 32, and comprises a motor 41 and a power gear set 42. The power gear set 42 is partially disposed in the upper casing 31 and partially disposed in the lower casing 32. The motor 41 is disposed in the lower casing 32 and is meshed with the power gear set 42, its disposing position can be adjusted according to usage or manufacturing requirements, and is not limited by this structure. The motor 41 is capable of driving the power gear set 42 to act, the power gear set 42 is a reduction gear set capable of providing a rotational speed change, and a front end of the power gear set 42 is provided with an eccentric shaft 421. In addition, the manipulation port 321 of the lower casing 32 is disposed at a position close to and below the motor 41 of the power source 40.

Figure 5A:
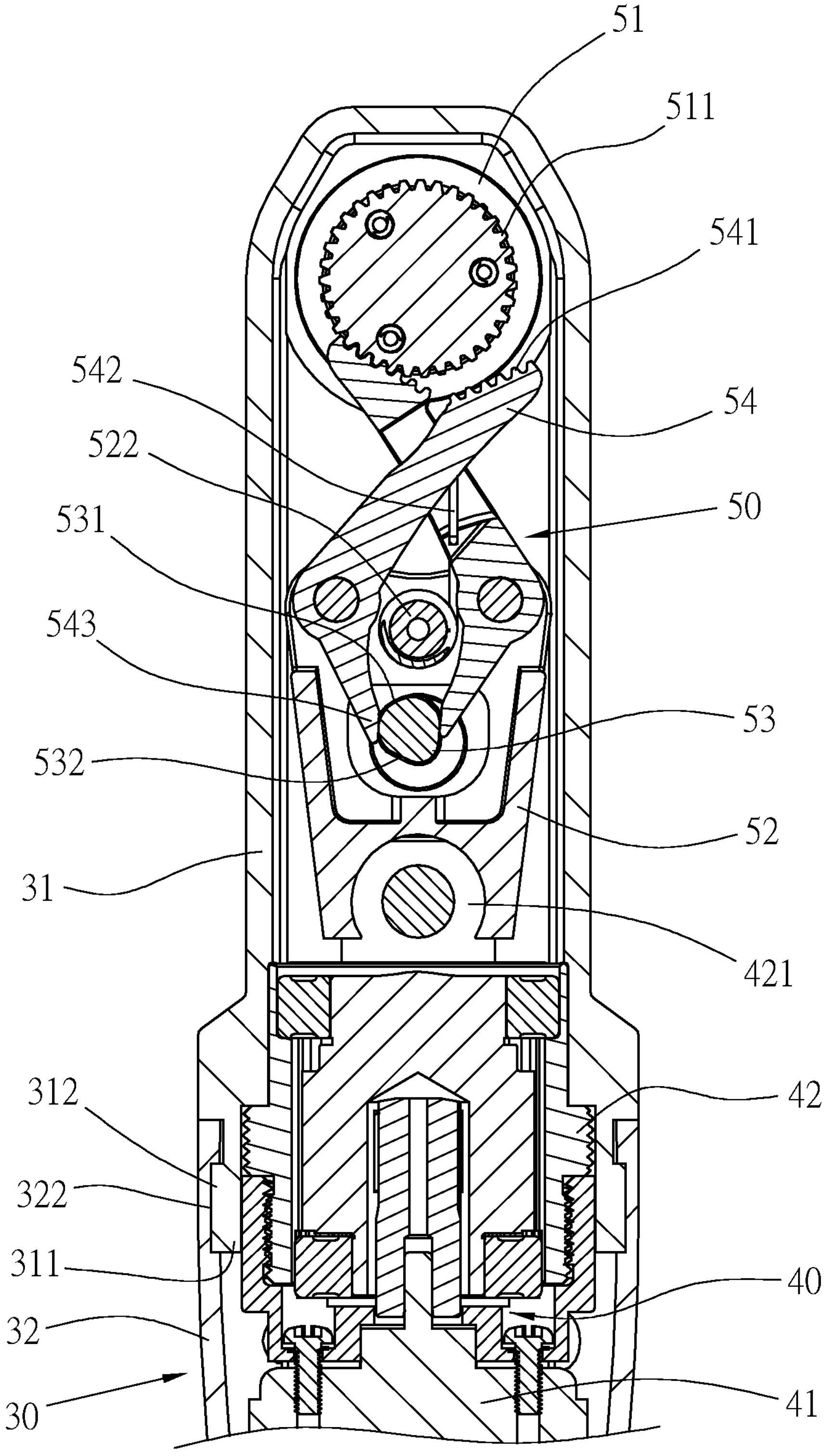
FIG. 5A is a cross-sectional view of the power tool along the section line 5A-5A of FIG. 3.
Figure 5B:
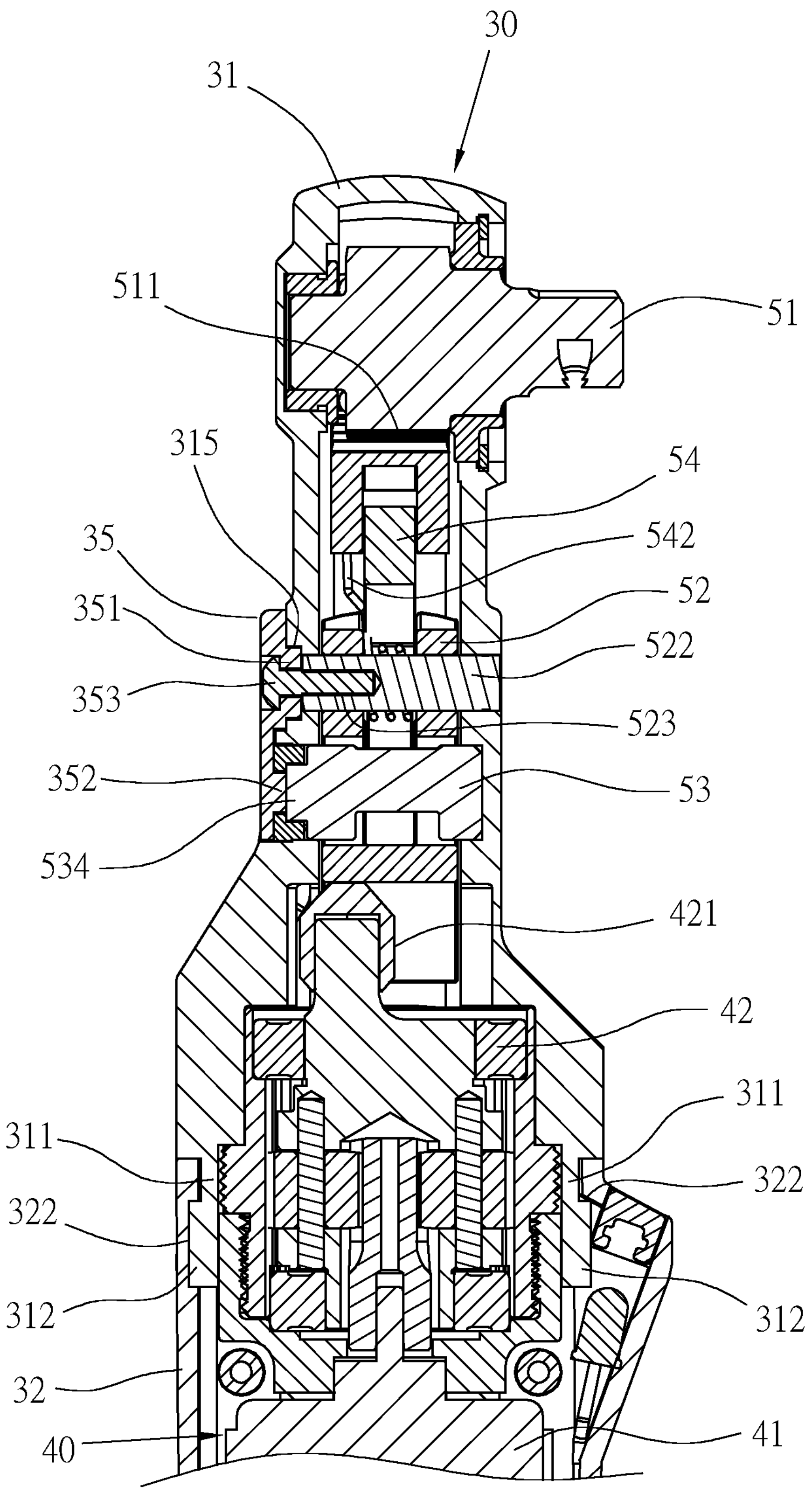
FIG. 5B is a cross-sectional view of the power tool along the section line 5B-5B of FIG. 3.

Please refer to FIGS. 4 and 5A and 5B, the driving device 50 is disposed in the upper casing 31, and one end of the driving device 50 is pivotally disposed with a working head 51 on the upper casing 31. After the upper casing 31 is removed, the driving device 50 can also be removed, which is easy for maintenance and replacement. The working head 51 is annularly provided with a ratchet 511 on a circumference thereof. A control unit of the driving device 50 comprises a swing member 52, a control member 53 and two driving members, one end of the swing member 52 is pivotally disposed on the upper casing 31, and another end of the swing member 52 is recessed with a bearing groove 521. The eccentric shaft 421 of the power source 40 is accommodated in the bearing groove 521, when the eccentric shaft 421 rotates eccentrically, the swing member 52 is driven to swing back and forth. Furthermore, the swing member 52 is pivotally disposed in the upper casing 31 by a pivot shaft 522, one end of the pivot shaft 522 is screwed with a screw hole 523, and one side of the pivot shaft 522 with the screw hole 523 is disposed at a position of the positioning hole 315. The control member 53 is pivotally disposed in the swing member 52, and is provided with an abutted part 531 and two guiding parts 532, the two guiding parts 532 are disposed on two sides of the abutted part 531 respectively. The control member 53 is provided with a cam 533, a position of the cam 533 can be changed to drive the control member 53 to switch directions and change different positions. A circular hole 534 is recessed in an axis of the control member 53. The two driving members are disposed between the working head 51 and the swing member 52. In this embodiment, the two driving members are composed of two swing arms 54, so that the working head 51 can be driven by the driving member to rotate in a predetermined direction. The driving members are pivotally disposed on the swing member 52 and capable of swinging with the swing member 52. One end of each of the two swing arms 54 is meshed with the ratchet 511 of the working head 51 by a teeth part 541, and another end of each of the two swing arms 54 is provided with an abutting part 543, and the abutting part 543 is abutted with the control member 53. An elastic element 542 is elastically disposed on the two swing arms 54 with two ends, so that the two swing arms 54 can be pressed against the working head 51 by elastic force. The other ends of the two swing arms 54 are in contact with the control member 53. When the abutted part 531 of the control member 53 is connected with one of the swing arms 54, one end of the swing arm 54 that is connected to the working head 51 will be pushed away from the working head 51, and the other swing arm 54 will be in contact with the guiding part 532, so that the swing arm 54 can be in contact with the working head 51. When the swing member 52 is actuated, the swing arm 54 in contact with the working head 51 will turn the working head 51 to rotate in a same direction. The above-mentioned structures of the power source 40 and the driving device 50 are structures of a conventional reversible power tool, related or similar driving methods in the technical field can be applied to the present invention, and the structures are not particularly limited. In addition, when the end cover 35 is covered in the maintenance hole 314 of the upper casing 31, the positioning part 351 can be inserted into the positioning hole 315, and the screw member 353 can be screwed into the screw hole 523 of the pivot shaft 522, so that a position of the pivot shaft 522 can be fixed and the swing member 52 can be pivotally disposed on the upper casing 31. And the circular column 352 of the end cover 35 is also correspondingly disposed in the circular hole 534 of the control member 53, so that a position of a rotation axis of the control member 53 can be kept fixed, and the end cover 35 can have a protective effect on an outer side of the control member 53, especially at a position of the cam 533, thereby capable of preventing dust and dirt from entering and maintaining internal cleanliness. When the cam 533 of the control member 53 is to be installed and maintained, because a diameter of the maintenance hole 314 is larger than a size of the cam 533, the cam 533 can be installed and disassembled directly from a position of the maintenance hole 314. In this way, a thickness of the entire upper casing 31 can be reduced. Users can also directly repair, disassemble and replace through the maintenance hole 314, which can reduce a disassembly time and enhance the convenience of maintenance.

Please refer to FIG. 4, the reversing assembly 60 is provided on the manipulation port 321 of the lower casing 32, so that the reversing assembly 60 is located at a peripheral position of the power source 40. The reversing assembly 60 has a circular reversing member 61 pivotally disposed in the manipulation port 321 and capable of generating a rotational displacement change. A gear 611 is provided at a bottom of the reversing member 61, and the gear 611 rotates with the reversing member 61. In order to facilitate a user to apply force, the reversing member 61 is protruded with a toggle lever 612. The toggle lever 612 is disposed on an outer side of the lower casing 32. The toggle lever 612 has a length greater than a radius of the gear 611. Therefore, the toggle lever 612 is capable of toggling the reversing member 61 by applying a small acting force to make it easy for the user to manipulate. The toggle lever 612 is disposed in a direction toward the grip part 33 of the casing 30.

Please refer to FIG. 4, in this embodiment, the linkage member 70 is composed of two connecting rods 71 connected with each other, the linkage member 70 can also be composed of different components such as a single connecting rod, as long as positional changes can be transmitted, any structure can be used as the linkage member 70. Ends of the two connecting rods 71 of the linkage member 70 are respectively provided with a U-shaped opening 711 sleeved on the cam 533 of the control member 53 and a rack 712 meshed on the gear 611 of the reversing member 61 and capable of producing corresponding positional changes. A U-shaped sleeve part 713 is respectively provided at positions where the two connecting rods 71 are connected with each other. When the reversing member 61 displaces, the control member 53 will also produce a corresponding displacement change. When the control member 53 is rotated due to displacement, positions of the abutted part 531 and the guiding parts 532 will also displace angularly correspondingly, thereby the control member 53 is capable of contacting the different swing arms 54 to control the different swing arms 54 to contact with the working head 51. When the reversing member 61 and the control member 53 are driven by the linkage member 70, rotation diameters of the reversing member 61 and the control member 53 are different, so that a rotation angle of the reversing member 61 and a rotation angle of the control member 53 are different. Further, the rotation angle of the reversing member 61 is about plus or minus 50 degrees, while the rotation angle of the control member 53 is plus or minus 30 degrees, so that the user can switch a position of the reversing member 61 distinctively. In addition, the linkage member 70 is disposed on an inner side of the casing 30, so that the linkage member 70 and the control member 53 will not be disturbed by external force to affect actions of switching directions, and can also be prevented from being contaminated with dust.

Please refer to FIG. 5A, when the power tool 20 is manipulated, the power source 40 can be activated first, so that the motor 41 is capable of driving the power gear set 42 to rotate, and driving the eccentric shaft 421 to rotate eccentrically. The eccentric shaft 421 is capable of swinging eccentrically in the bearing groove 521 of the swing member 52, thereby causing the swing member 52 to swing eccentrically toward two ends with a pivot point as a center. When the swing member 52 swings, the swing member 52 will drive the swing arm 54 contacted with the working head 51 to keep turning the working head 51, so that the working head 51 continues to rotate in a same direction, and can continue to move in a same direction. When holding the power tool 20, the user can hold on a position of the grip part 33 below the lower casing 32 of the casing 30. The single-handedly holding length H between the bottom 311 of the grip part 33 and the manipulation port 321 can be provided for the user's hand to grip.

Figure 8:
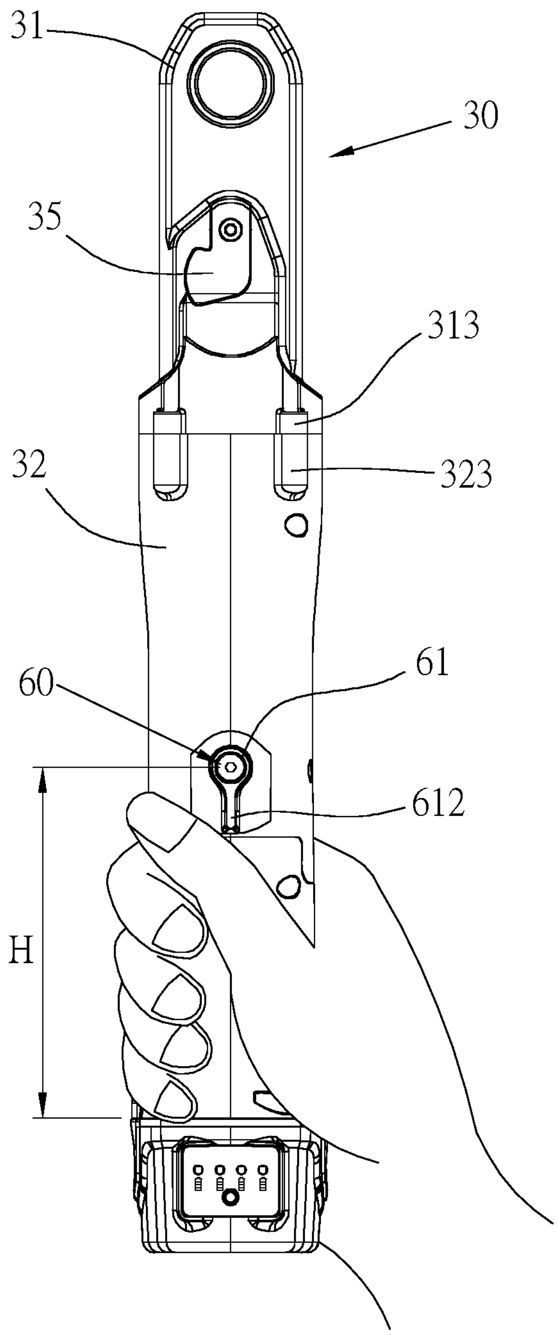
FIG. 8 is a schematic diagram of holding the power tool with a hand to perform a manipulating action according to the first preferred embodiment of the invention.
Figure 9:
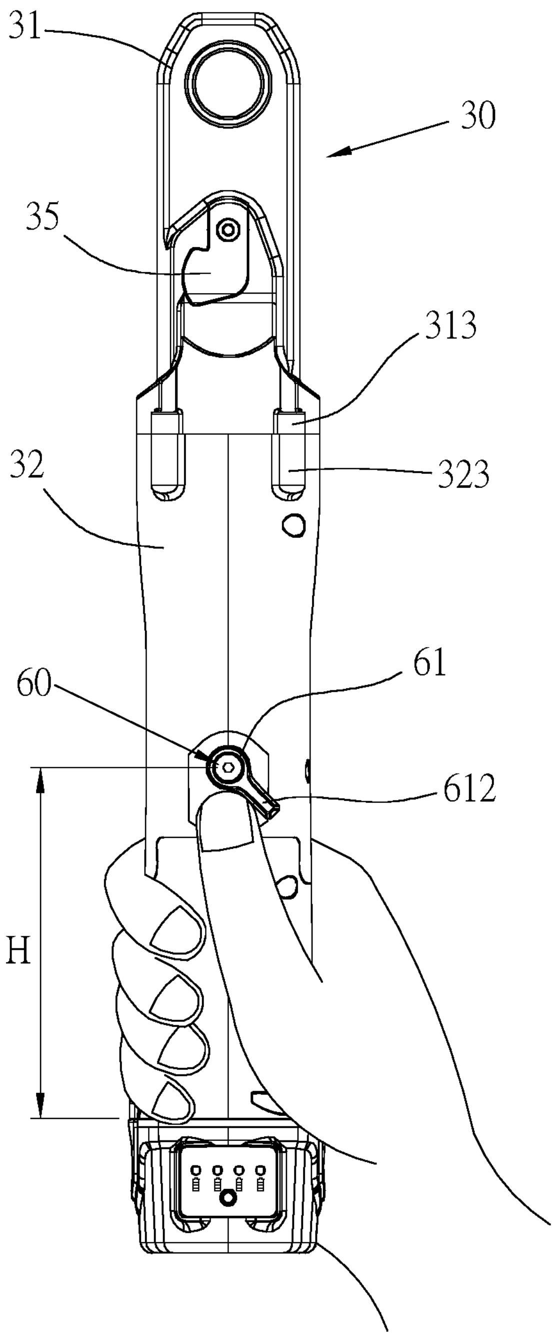
FIG. 9 is a schematic diagram of holding the power tool with a hand to perform a reversing action according to the first preferred embodiment of the invention.

Please refer to FIGS. 8 and 9, the user's thumb is located just near the manipulation port 321, which is convenient for the user to toggle with the thumb. When the toggle lever 612 is toggled, the user's hand can be maintained at a position of the grip part 33 in an original manipulation holding state. The toggle lever 612 can be toggled by the thumb of the hand holding on the power tool 20. When switching direction, there is no need to move a position of the power tool 20, because the single-handedly holding length H matches with a size of the human hand. Therefore, when performing switching action, manipulation can be directly performed without changing hand-holding position and action, manipulation is relatively ergonomic and will not cause inconvenience in manipulation.

Figure 6:
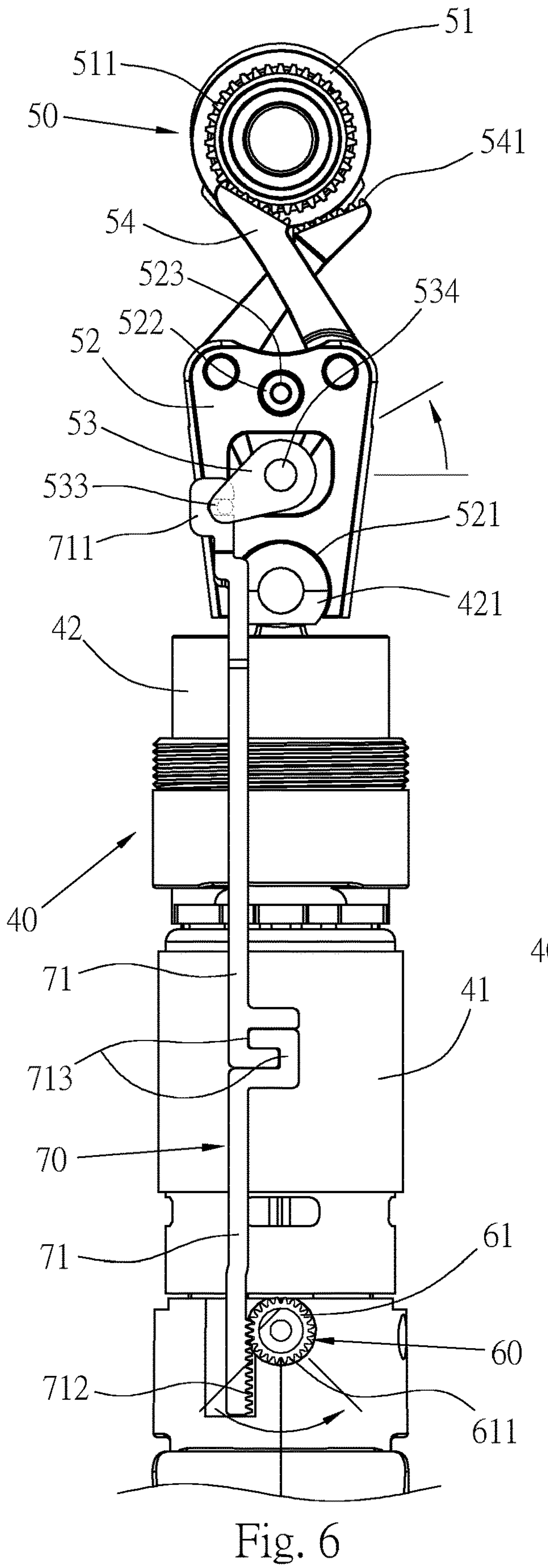
FIG. 6 is a schematic diagram of action of a reversing assembly upwardly pushing a linkage member according to the first preferred embodiment of the invention.
Figure 7:
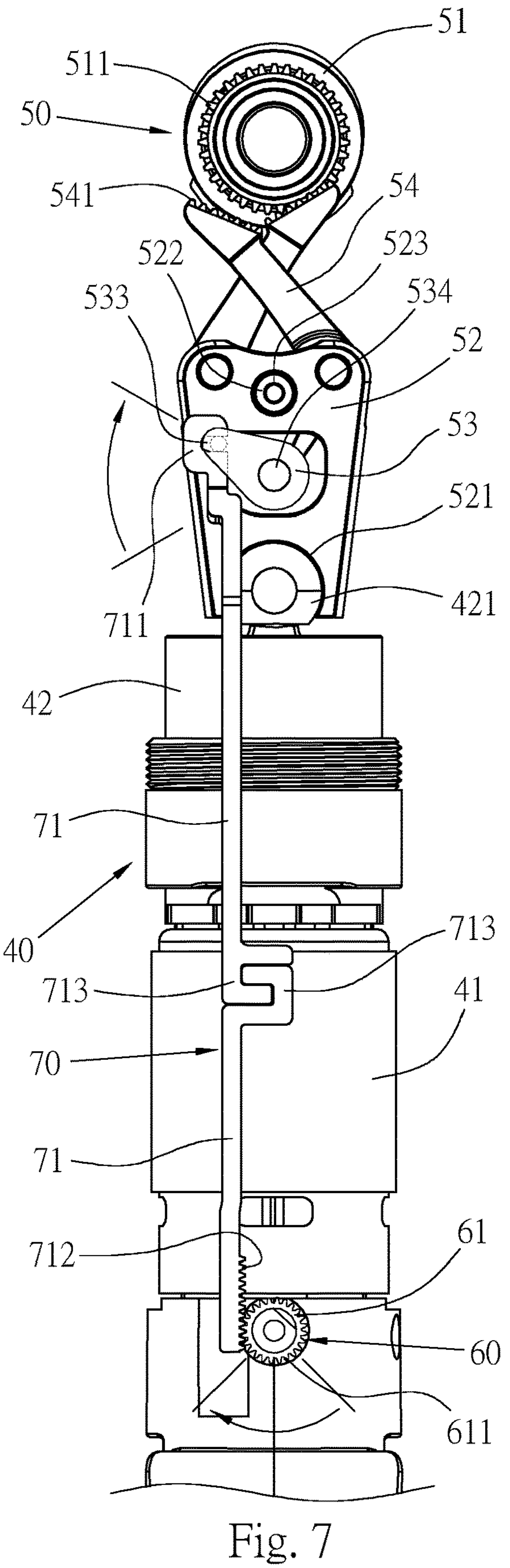
FIG. 7 is a schematic diagram of action of the reversing assembly downwardly pulling the linkage member according to the first preferred embodiment of the invention.

FIGS. 6 and 7 show a state of switching rotation directions of the power tool of the invention. When the reversing member 61 of the reversing assembly 60 is required to perform a rotating action to switch position, the user can turn the toggle lever 612 to rotate the reversing member 61, and the gear 611 is rotated to drive the rack 712 of the linkage member 70, so that the linkage member 70 is capable of producing a linear displacement change. Please refer to FIGS. 3 and 7, when the driving device 50 of the power tool 20 needs to switch a direction of rotation, the toggle lever 612 of the reversing member 61 is toggled by the user's thumb to switch a position of the reversing member 61, so that the reversing member 61 rotates clockwise (subject to the direction of FIG. 7) and drives the gear 611 to rotate clockwise synchronously, and the gear 611 drives the meshed rack 712 of the linkage member 70, causing the linkage member 70 to displace upward, and converting into the control member 53 displacing angularly. A rotation angle of the reversing member 61 is 50 degrees, and an angle of the control member 53 is 30 degrees. There is an angle difference between the reversing member 61 and the control member 53, so that when the user switches action, the reversing member 61 can generate a relatively obvious rotation angle, and the control member 53 only needs to be switched to a reversible angle. When the cam 533 of the control member 53 is displaced clockwise, the abutted part 531 will turn toward the swing arm 54 in another direction, that is, move away from the linkage member 70, so that the swing arm 54 abutted by the abutted part 531 is relatively away from the working head 51. The swing arm 54 originally abutted by the abutted part 531 will be in contact with the guiding part 532. At the same time, an elastic force of the elastic element 542 will push the swing arm 54 toward the working head 51, so that the swing arm 54 can be in contact with the working head 51, and the working head 51 is driven by the other swing arm 54, thereby the working head 51 is capable of rotating in an opposite direction.

Please refer to FIG. 6, when rotation direction needs to be switched again, only need to turn the reversing member 61 of the reversing assembly 60 in another direction (counterclockwise direction). At this time, counterclockwise rotation of the reversing member 61 will drive the gear 611 to rotate in an opposite direction, causing the rack 712 of the linkage member 70 to displace downward, and the linkage member 70 drives the cam 533 of the control member 53 to rotate counterclockwise downwardly, so that the abutted part 531 moves toward the linkage member 70, and the working head 51 is meshed with the swing arm 54 away from the linkage member 70.

Figure 10:
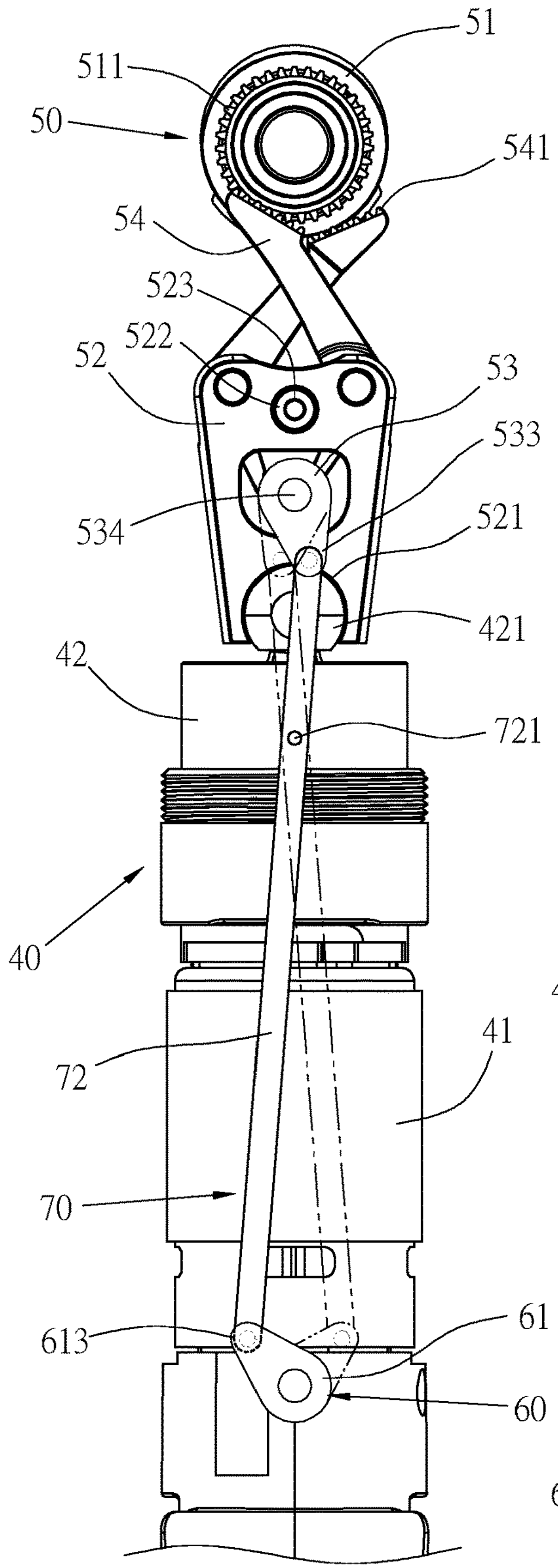
FIG. 10 is an internal structural diagram of a second preferred embodiment of the invention.

Please refer to FIG. 10, which is a second preferred embodiment provided by the invention. Its main structures are the same as those of the first preferred embodiment, and the same structure is represented by the same part number.

Wherein a reversing member 61 of a reversing assembly 60 is a cam 613. A linkage member 70 is composed of a connecting rod 72, a fulcrum 721 is disposed on the connecting rod 72, and the fulcrum 721 is pivotally disposed on a power tool 20. The cam 613 of the reversing member 61 is connected to one end of the connecting rod 72, a cam 533 of a control member 53 of a driving device 50 is connected to another end of the connecting rod 72, and the fulcrum 721 can be disposed at a position close to the control member 53. When the reversing member 61 rotates and displaces, the cam 613 will also change its position correspondingly, change of a position of the cam 613 will drive one end of the connecting rod 72, causing the connecting rod 72 to change position by using the fulcrum 721 as an axis, and the other end of the connecting rod 72 produces a displacement action opposite to the positional change of the reversing member 61, thereby capable of switching a position of the cam 533 of the control member 53. Through lever action of the connecting rod 72, in addition to be capable of adjusting displacement changes between the reversing member 61 and the control member 53, also capable of producing changes of different applied forces through differences in lengths between two ends of the connecting rod 72 and the fulcrum 721. In addition, through changes of arm of force between the toggle lever 612 and the cam 613 of the reversing member 60, and arm of force of the cam 533 of the control member 53, a force applied by the user to toggle the reversing member 61 to perform reversing action can be reduced.

Figure 11:
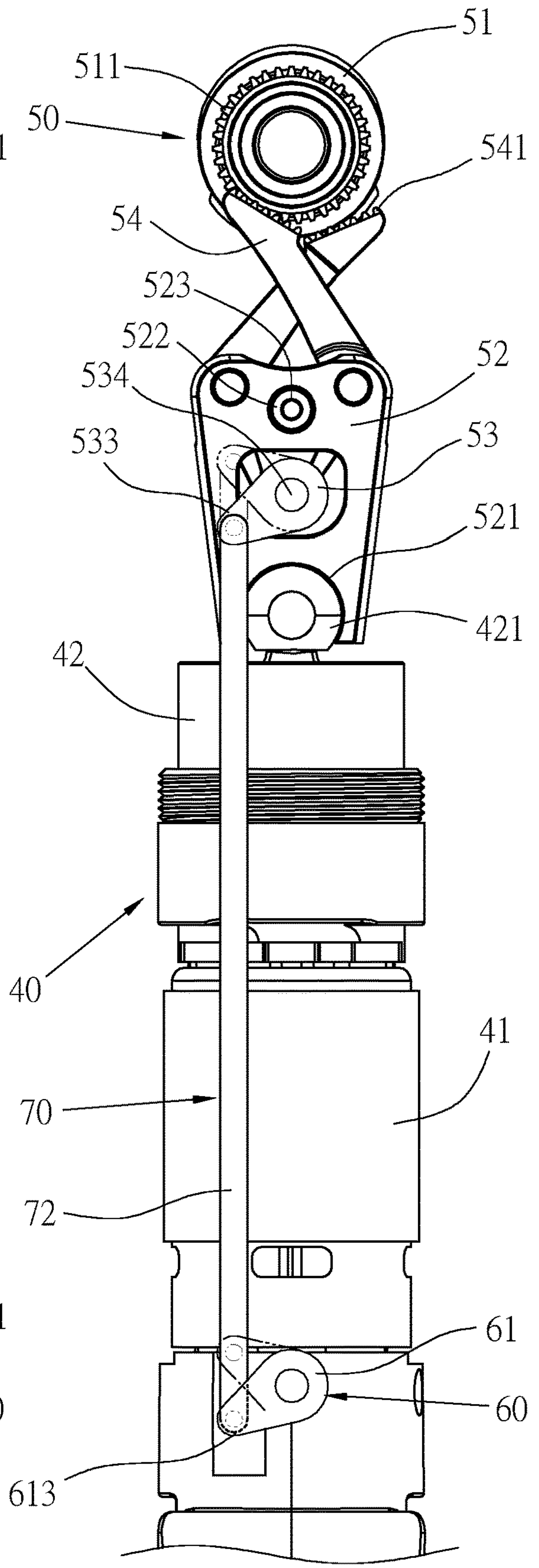
FIG. 11 is an internal structural diagram of a third preferred embodiment of the invention.

Please refer to FIG. 11, which is a third preferred embodiment provided by the invention. Its main structures are the same as those of the previous preferred embodiment, and the same structure is represented by the same part number, which will not be mentioned herein again.

Wherein a connecting rod 72 is directly connected with a cam 613 of a reversing member 61 and a cam 533 of a control member 53. The connecting rod 72 changes a position of the cam 533 of the control member 53 with positional changes generated by moving the cam 613 when the reversing member 61 rotates.

Figure 12:
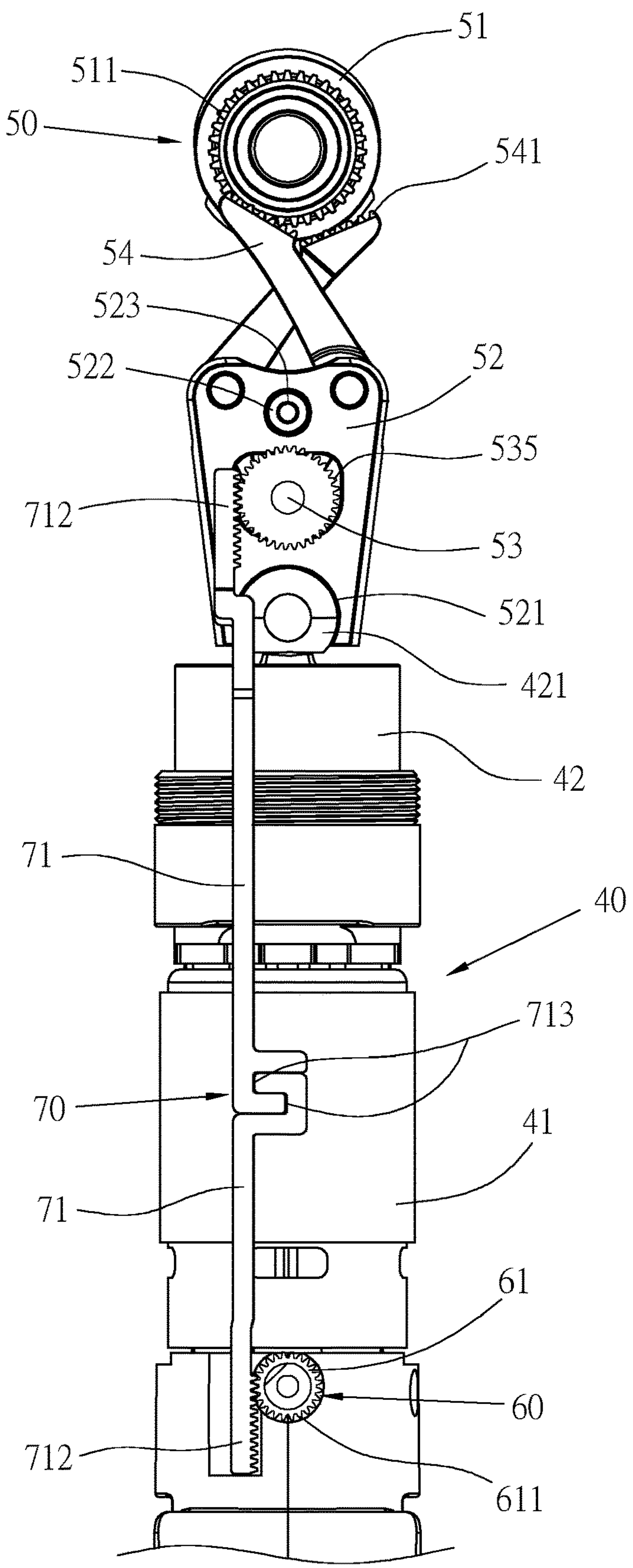
FIG. 12 is an internal structural diagram of a fourth preferred embodiment of the invention.

Please refer to FIG. 12, which is a fourth preferred embodiment provided by the invention. Its main structures are the same as those of the first preferred embodiment, and the same structure is represented by the same part number, which will not be mentioned herein again.

Wherein two ends of a connecting rod 71 of a linkage member 70 are a rack 712 respectively, and a driven gear 535 is correspondingly disposed on a control member 53. A number of teeth of the driven gear 535 is greater than that of a gear 611 of a reversing member 61, that is, a diameter of the driven gear 535 is greater than that of the gear 611. When switching direction, the gear 611 of the reversing member 61 will drive a rack 712 at a lower end of the connecting rod 71 of the linkage member 70 to change position, and at the same time, the rack 712 at an upper end of the connecting rod 71 of the linkage member 70 will drive the driven gear 535 to rotate, thereby driving the control member 53 to rotate and reverse direction. Because the diameters of the gear 611 and the driven gear 535 are different, under a same number of rotating teeth, a rotation angle of the gear 611 is greater than a rotation angle of the driven gear 535.

Figure 13:
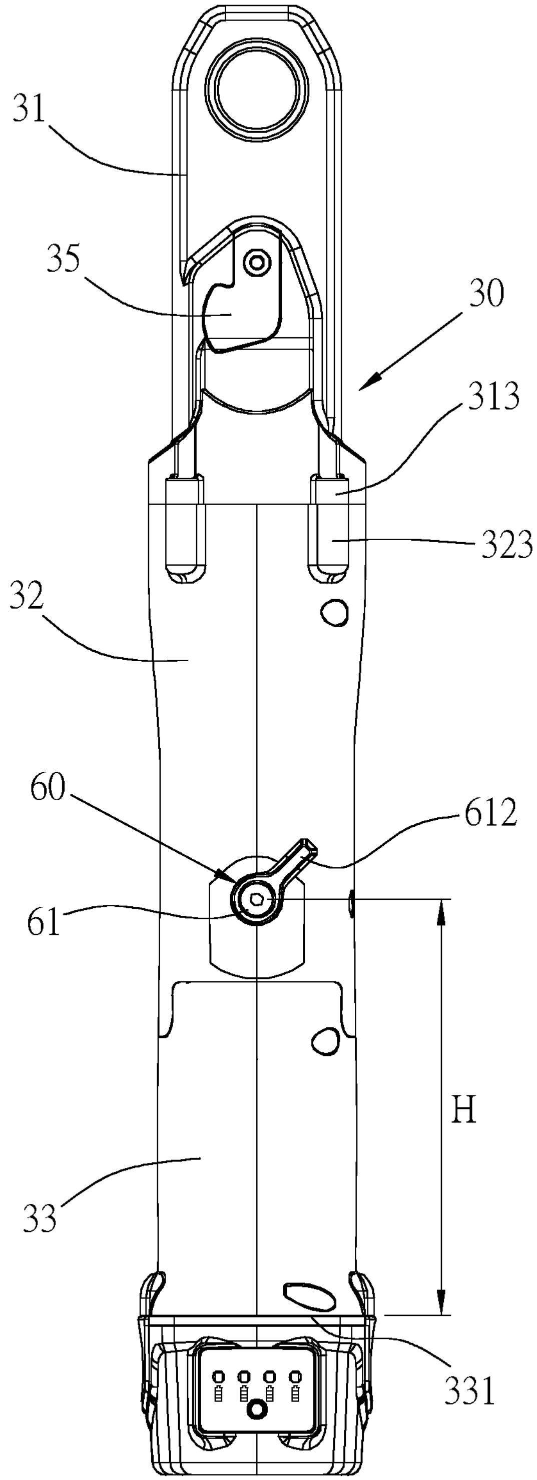
FIG. 13 is an external schematic diagram of the power tool according to a fifth preferred embodiment of the invention.

Please refer to FIG. 13, which is a fifth preferred embodiment provided by the invention. Its main structures are the same as those of the first preferred embodiment, and the same structure is represented by the same part number.

Wherein in a reversing member 61 of a reversing assembly 60, a toggle lever 612 is disposed toward a direction of a driving device 50, that is, toward a top end. During manipulation, because the user's thumb is placed at a position of the toggle lever 612 to toggle; relatively, the single-handedly holding length H between a manipulation port 321 and a bottom 311 of a grip part 33 can be disposed with a slightly shorter length to shorten an overall length, so that a center of gravity of a power tool 20 can be controlled easily.

Figure 14:
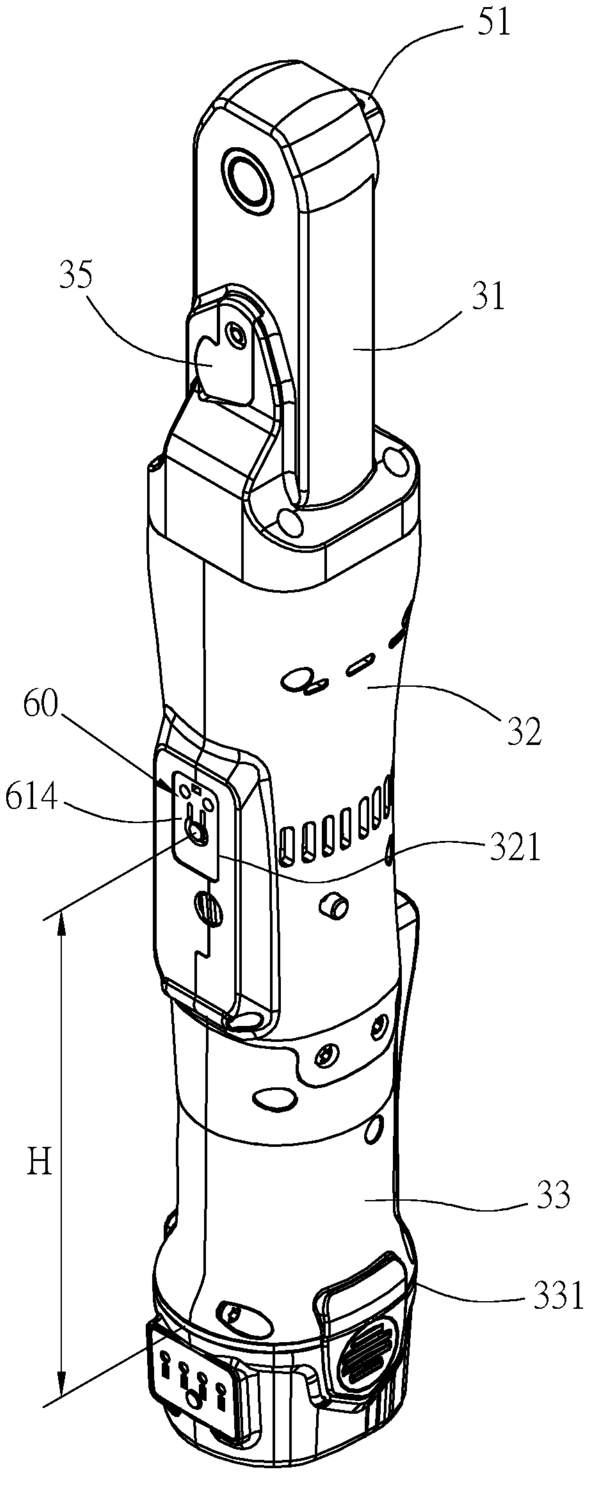
FIG. 14 is a perspective view of the power tool according to a sixth preferred embodiment of the invention.
Figure 15:
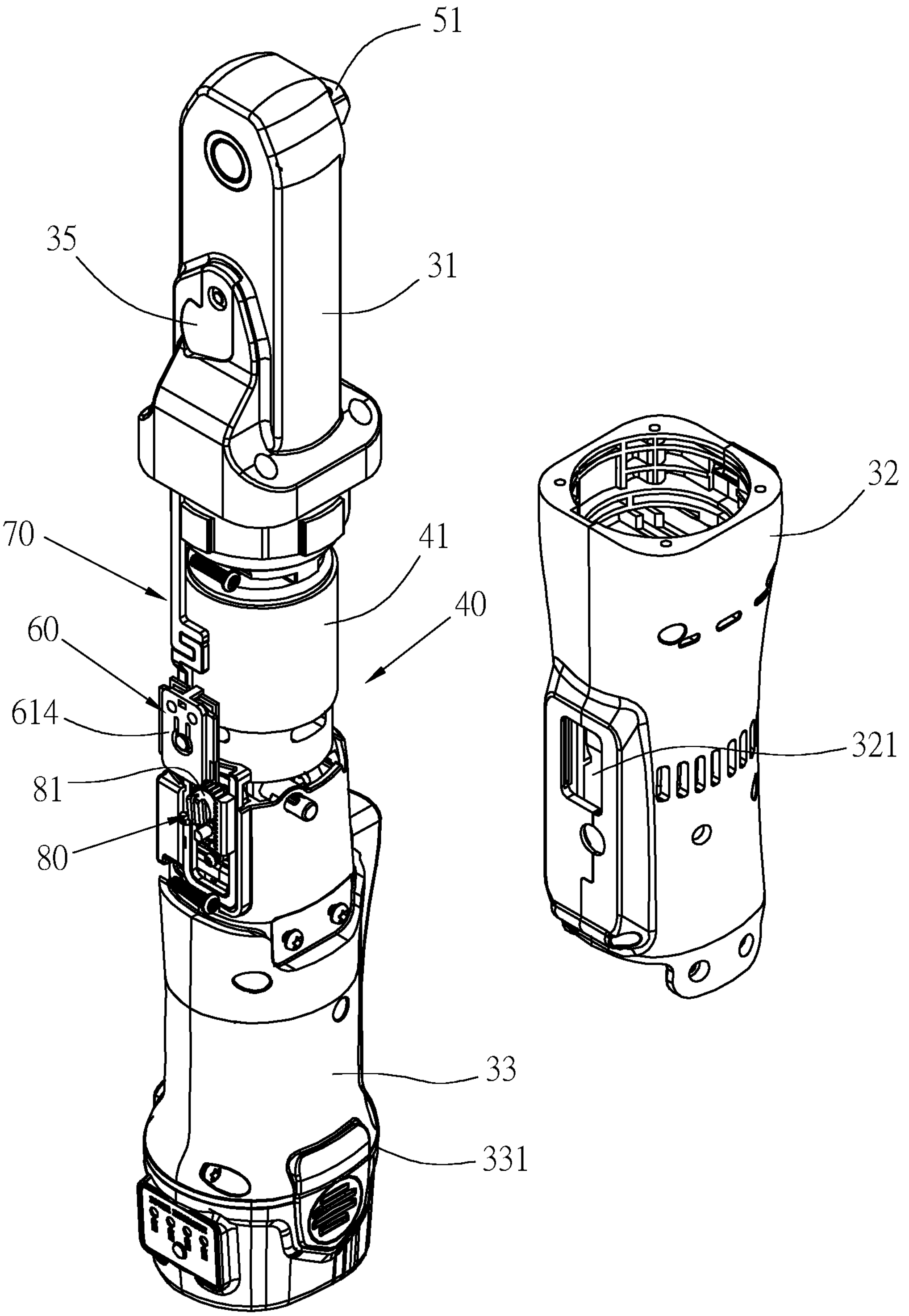
FIG. 15 is a partial exploded view of the power tool according to the sixth preferred embodiment of the invention.

Please refer to FIGS. 14 and 15, which is a sixth preferred embodiment provided by the invention. Its main structures are the same as those of the first preferred embodiment, and the same structure is represented by the same part number.

Wherein a reversing member 61 of a reversing assembly 60 is a button 614, the reversing member 61 is disposed on a side of a motor 41 of a power source 40, and further comprises an electric reversing unit 80, which is provided with an electromagnetic reversing part 81. The button 614 is capable of generating an electronic signal to the electric reversing unit 80 by pressing. After the electric reversing unit 80 receives the signal, it will produce an electromagnetic effect to cause the electromagnetic reversing part 81 to produce a displacement change. In this embodiment, the electromagnetic reversing part 81 is connected to a cam 533 of a control member 53 through a linkage member 70, and the electromagnetic reversing part 81 is also capable of directly or indirectly driving the control member 53 to generate reversing action, a way in which the electromagnetic reversing part 81 acts is not limited. When the electromagnetic reversing part 81 displaces, it will also drive the linkage member 70 to drive the cam 533 to change its position, thereby causing the control member 53 to change its position to abut against the different swing arms 54. When the user uses a power tool 20, the user can hold a grip part 33 with one hand, because the single-handedly holding length H between a manipulation port 321 and a bottom 311 of the grip part 33 enables the user to easily hold and manipulate the power tool 20 with one hand, when reversing action is to be performed, the user's thumb can just be located on the button 614 of the reversing member 61, enabling the user to be capable of performing reversing action with the thumb without moving the hand held on the grip part 33, holding and manipulation and reversing action can be performed with one hand, and a holding position does not need to be changed.

Figure 16:
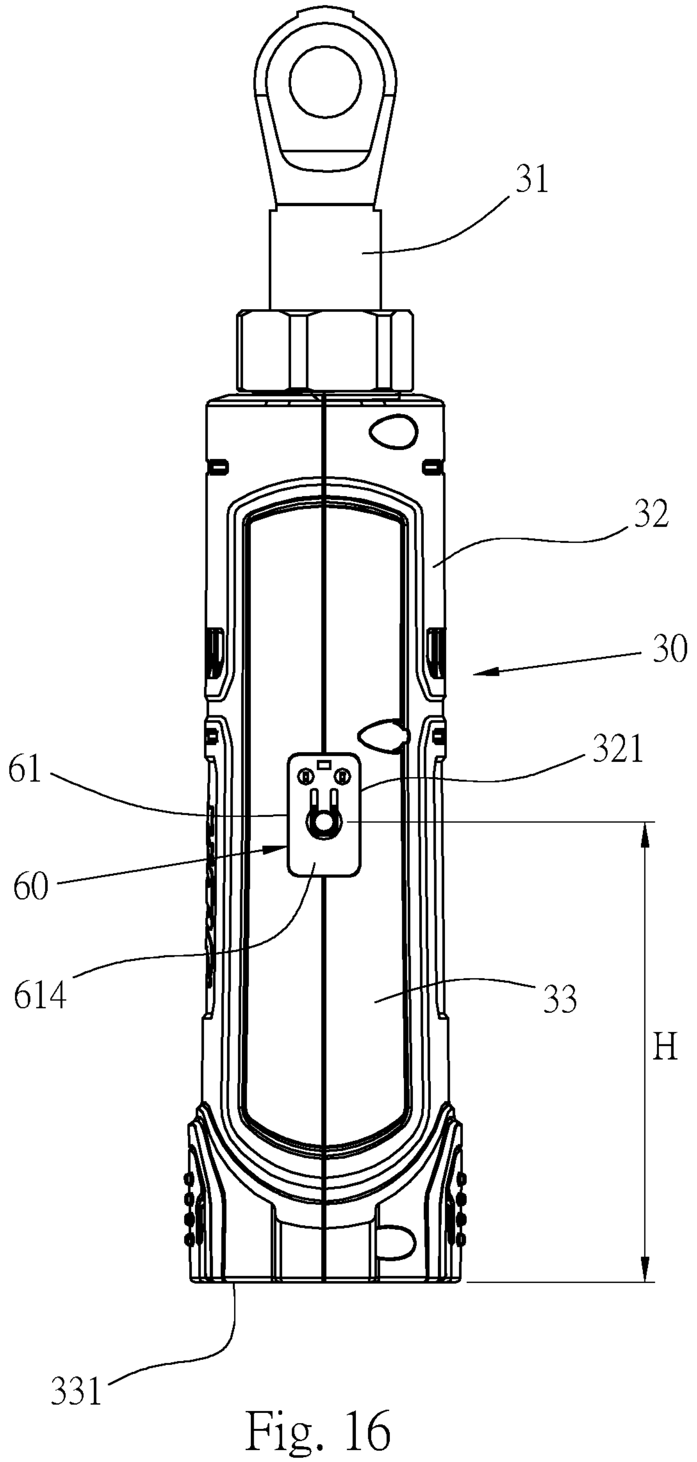
FIG. 16 is an external schematic diagram of the power tool according to a seventh preferred embodiment of the invention.
Figure 17:
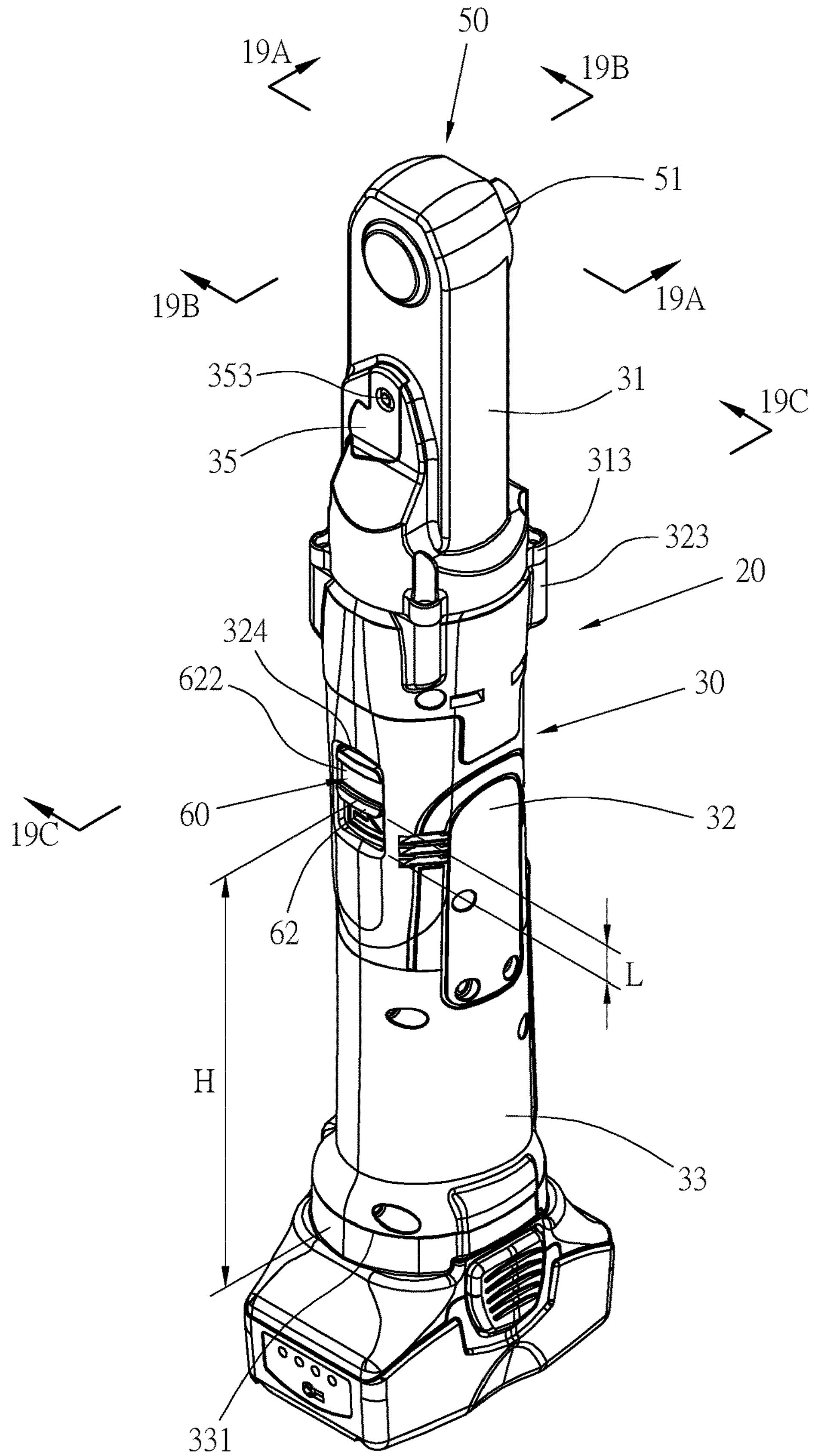
FIG. 17 is a perspective view of the power tool according to an eighth preferred embodiment of the invention.
Figure 18:
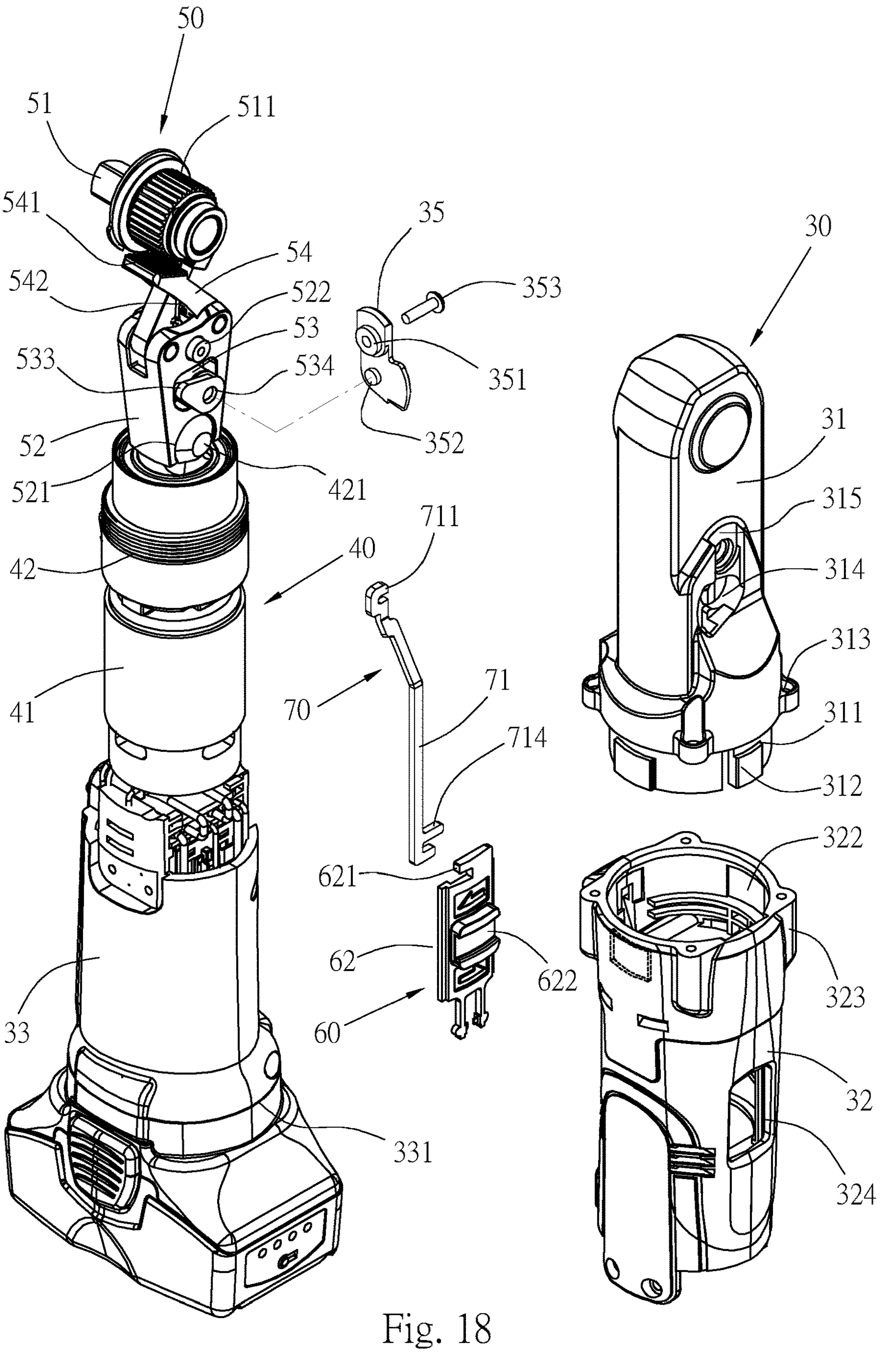
FIG. 18 is an exploded view of interior of the power tool according to the eighth preferred embodiment of the invention.

Please refer to FIG. 16, which is a seventh preferred embodiment provided by the invention. Its main structures are the same as those of the first preferred embodiment, and the same structure is represented by the same part number.

Wherein a lower casing 32 and a grip part 33 of a casing 30 are formed integrally, so that the user can have a better grip when holding the grip part 33, thereby a number of components of the casing 30 can be reduced, and difficulty of disassembly and assembly can be reduced.

Please refer to FIGS. 17 to 24, which is an eighth preferred embodiment provided by the invention. Its main structures are the same as those of the first preferred embodiment, and the same structure is represented by the same part number.

Wherein a side of a lower casing 32 has an elongated manipulation port 324 disposed at a position near a side of a motor 41 of a power source 40. The lower casing 32 is not provided with a protruding position on a periphery of the elongated manipulation port 324, so that a peripheral position of a elongated manipulation port 324 does not particularly protrude from the lower casing 32. Please refer to FIG. 17, a reversing assembly 60 is located at a position on the side of the motor 41 of the power source 40, and has an elongated pushed reversing member 62, which is slidably disposed in the elongated manipulation port 324, and capable of producing an upward and downward reciprocating displacement change in a pushing stroke L, the length L is between 25 mm-50 mm. A top of the pushed reversing member 62 is provided with a side slot 621, the side slot 621 moves with the pushed reversing member 62, the side slot 621 and the pushed reversing member 62 are disposed on a same plane, so that an overall thickness of the pushed reversing member 62 can be reduced, thereby a height of the periphery of the elongated manipulation port 324 does not need to be raised and protruded, and can also be installed on a periphery of the power source 40. A linkage member 70 is a connecting rod 71 in this embodiment, one end of the connecting rod 71 is provided with a U-shaped opening 711 sleeved on a cam 533 of a control member 53 and another end of the connecting rod 71 is provided with a side hook 714. The side hook 714 is laterally hooked in the side slot 621 of the pushed reversing member 62 on a same plane and capable of generating a relative positional change. The side hook 714 and the side slot 621 are connected with each other on a same plane, which can relatively reduce a thickness of assembly position, and positions on the peripheral of the elongated manipulation port 324 can also be keep leveled without raising or protruding position.

Figure 19A:
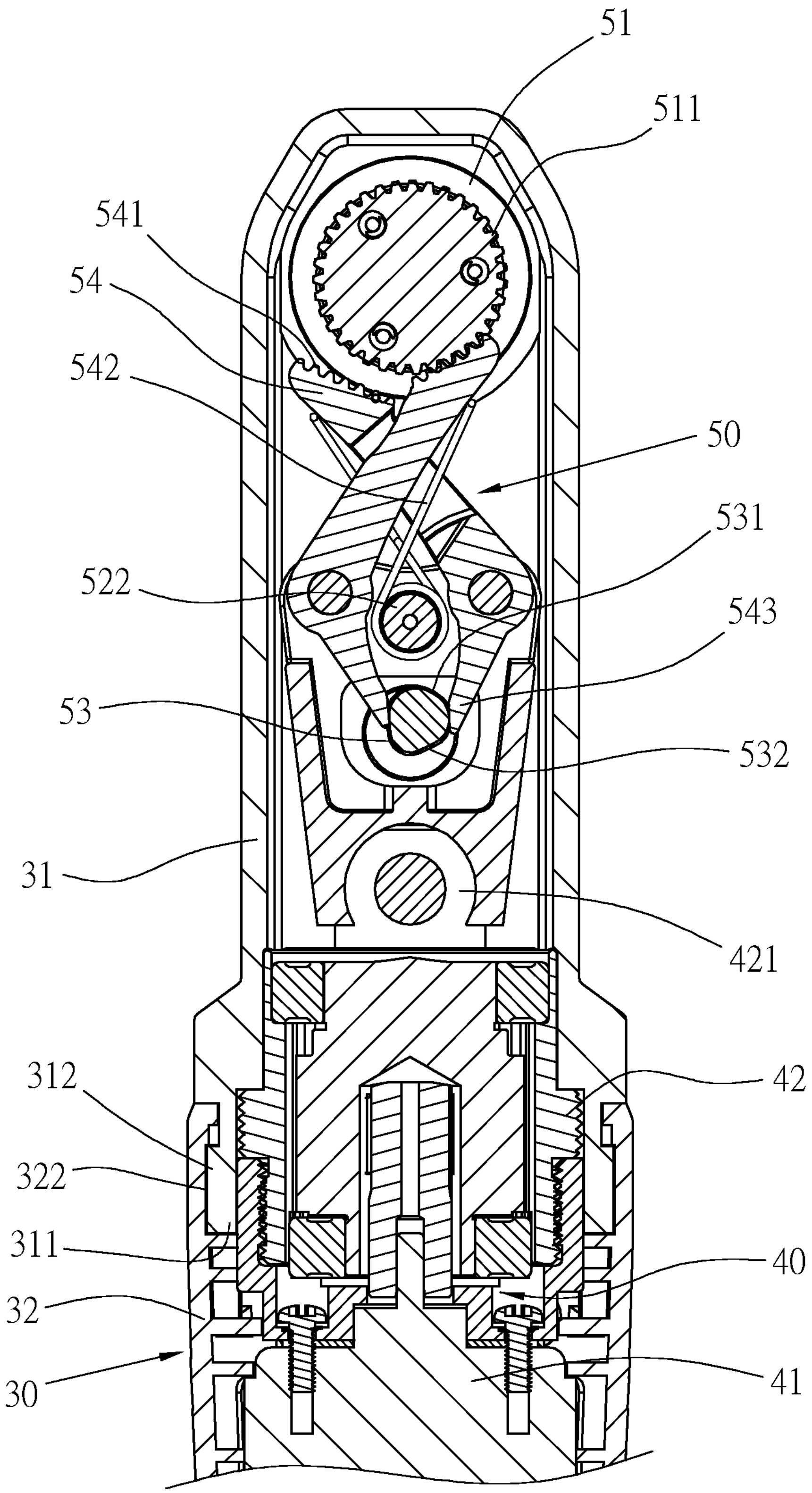
FIG. 19A is a cross-sectional view of the power tool along the section line 19A-19A of FIG. 17.
Figure 19B:
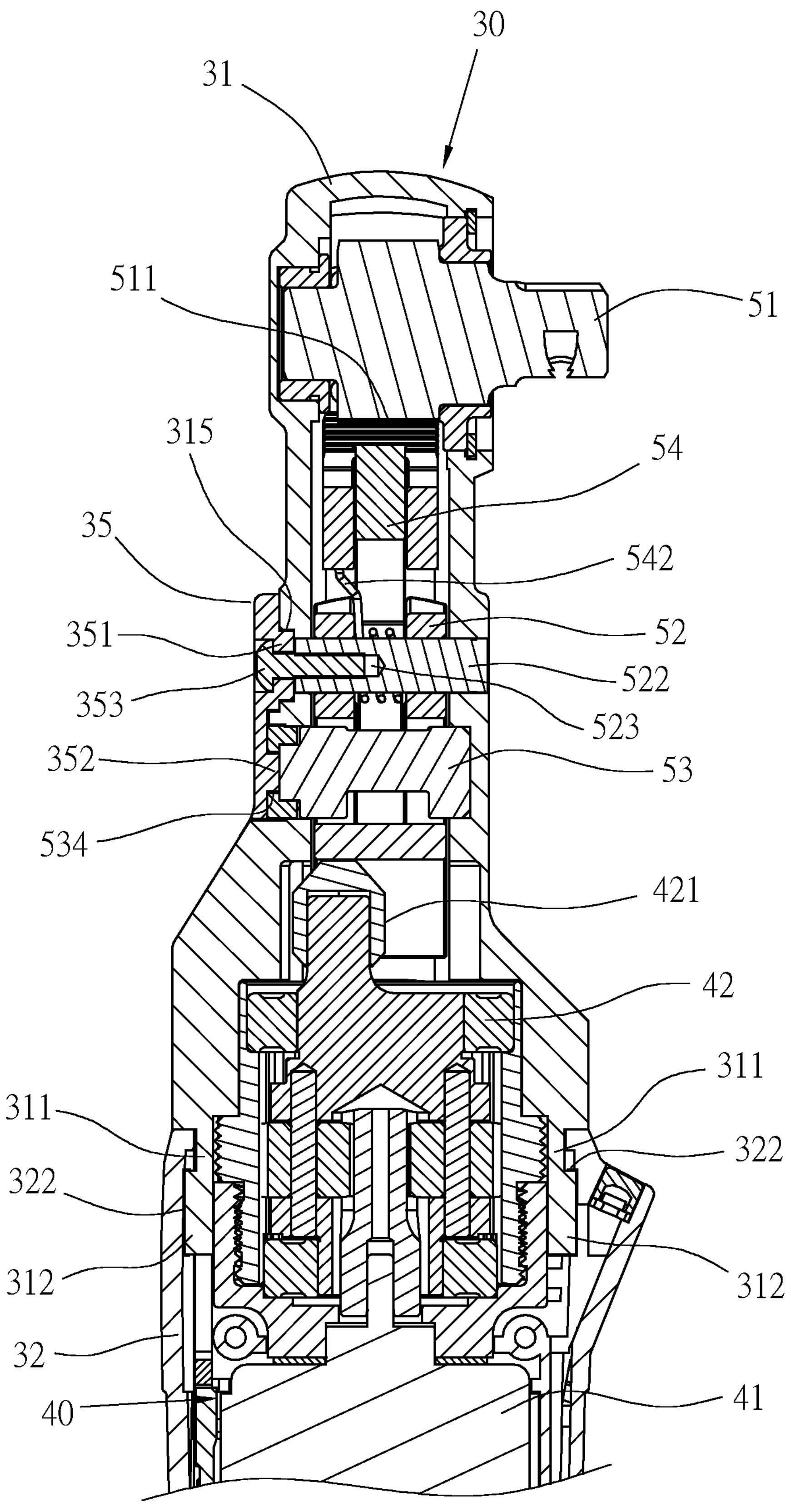
FIG. 19B is a cross-sectional view of the power tool along the section line 19B-19B of FIG. 17.
Figure 19C:
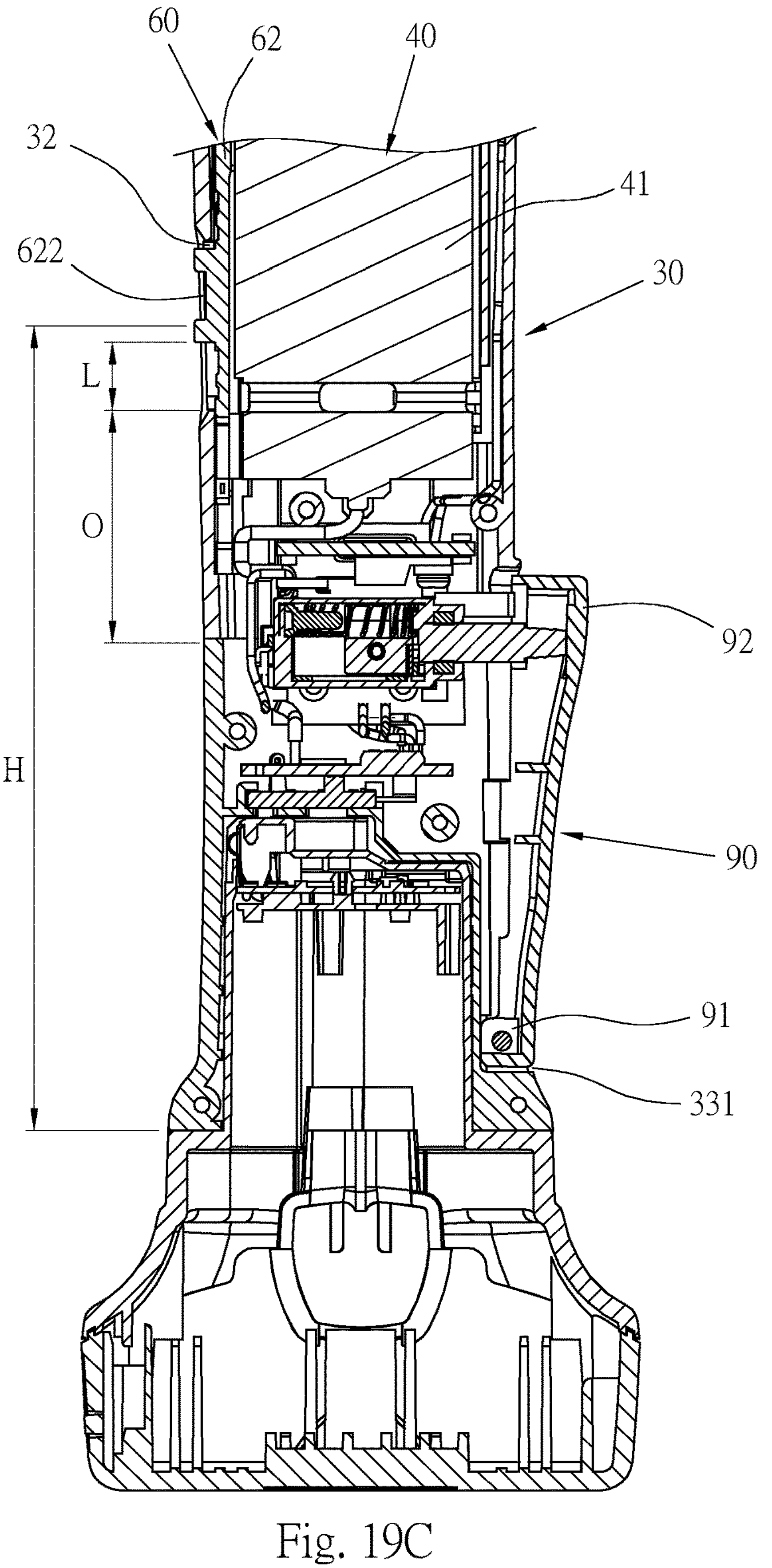
FIG. 19C is a cross-sectional view of the power tool along the section line 19C-19C of FIG. 17.
Figure 20:
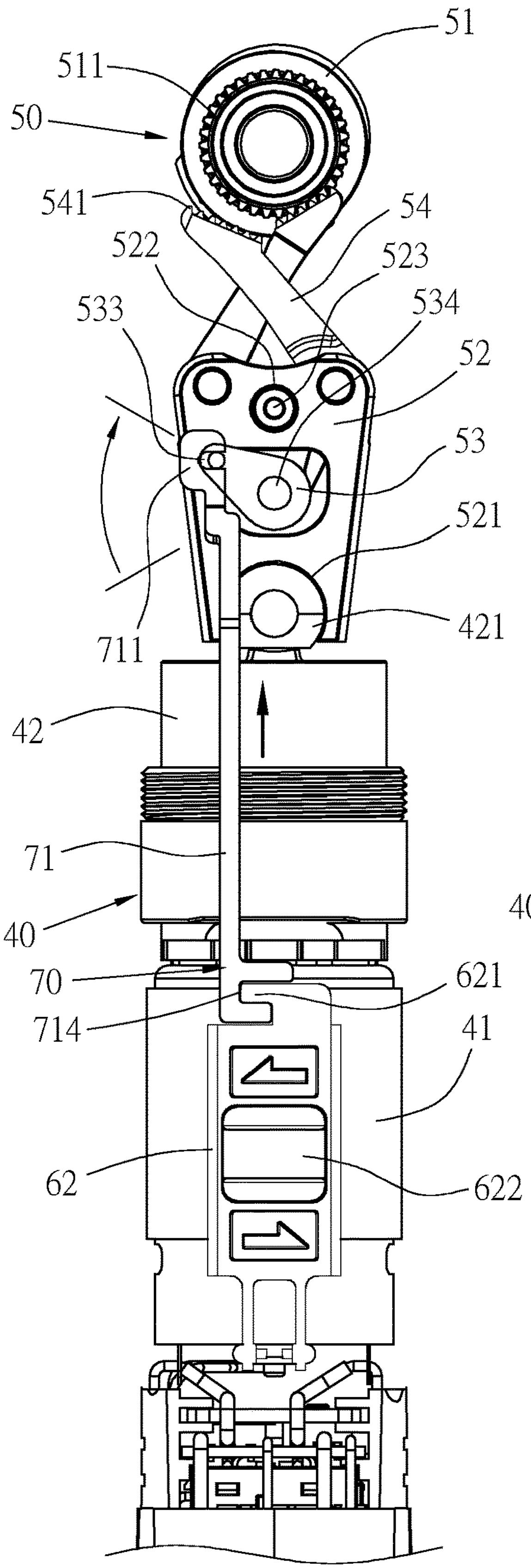
FIG. 20 is a schematic diagram of action of the reversing assembly upwardly pushing the linkage member according to the eighth preferred embodiment of the invention.
Figure 21:
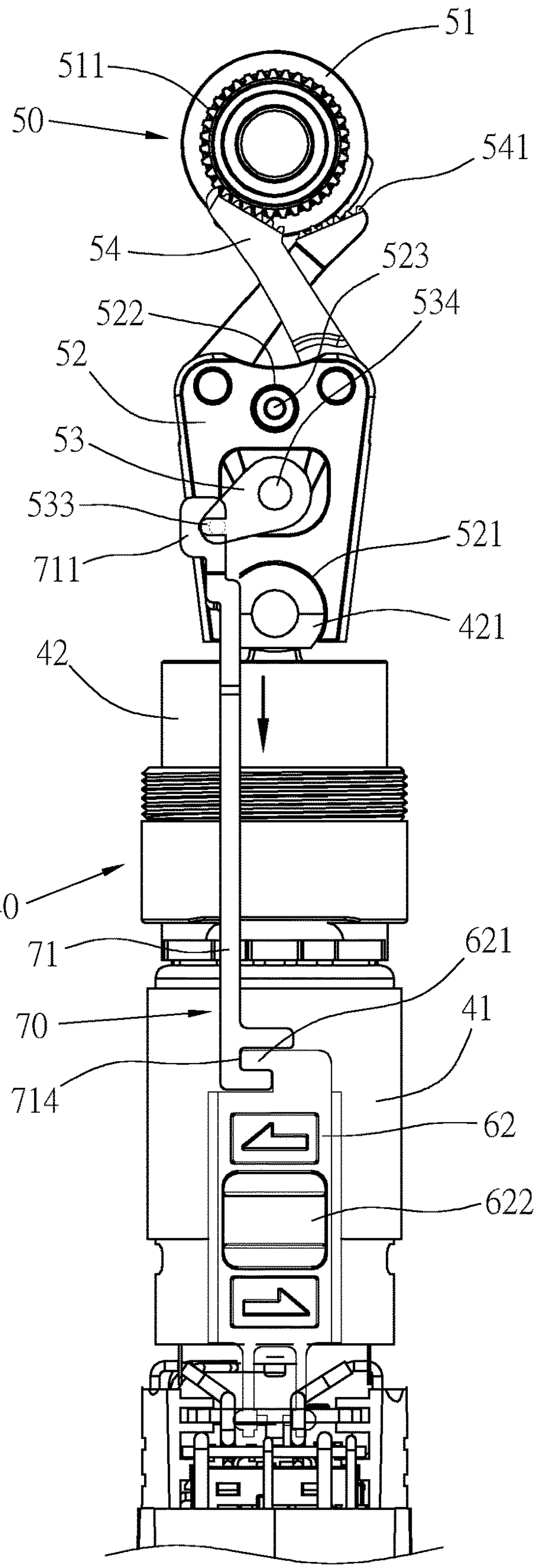
FIG. 21 is a schematic diagram of action of the reversing assembly downwardly pulling the linkage member according to the eighth preferred embodiment of the invention.
Figure 22:
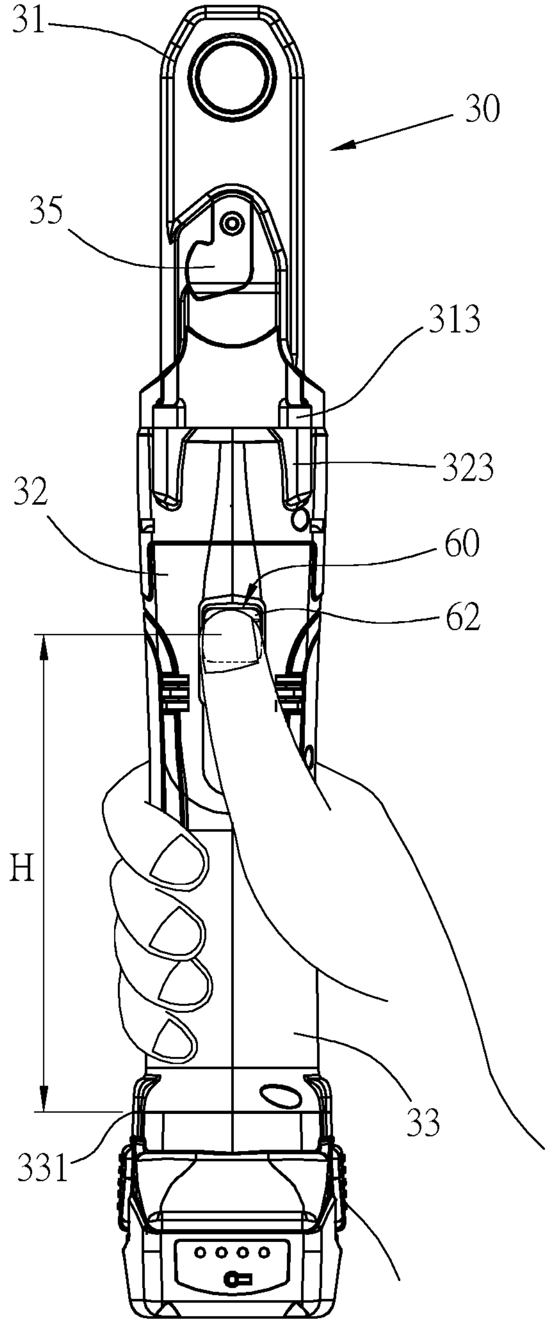
FIG. 22 is a schematic diagram of holding the power tool with a hand to perform a manipulating action according to the eighth preferred embodiment of the invention.
Figure 23:
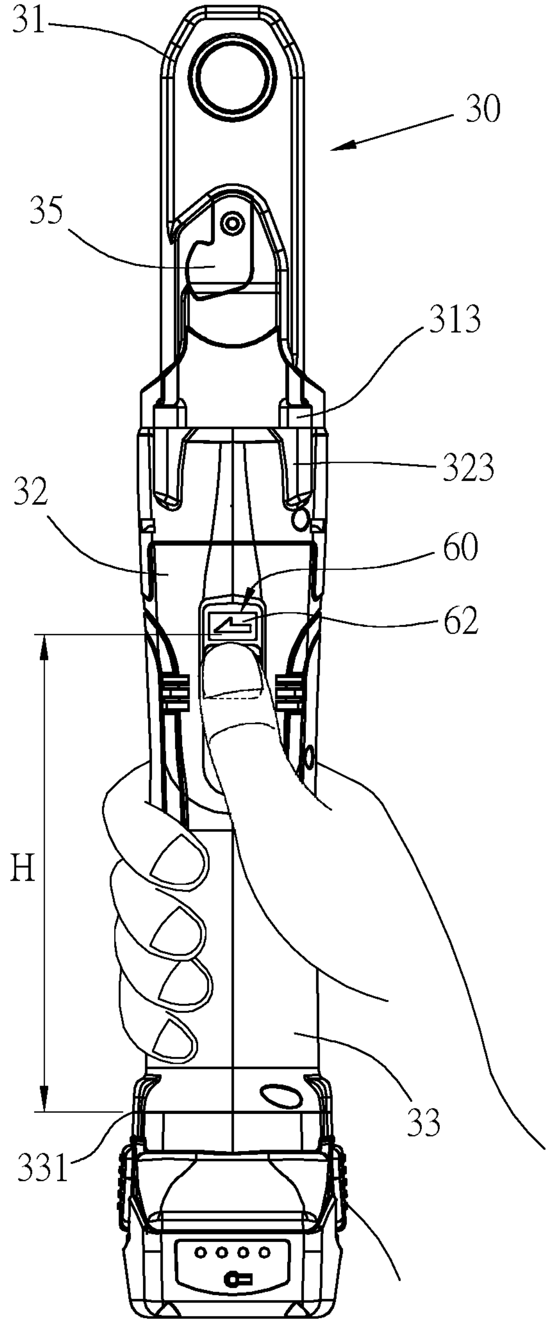
FIG. 23 is a schematic diagram of holding the power tool with a hand to perform a reversing action according to the eighth preferred embodiment of the invention.

Please refer to FIG. 19C, a trigger 90 is disposed on the grip part 33, the trigger 90 has a pivot end 91 and a pressing end 92. The pivot end 91 is pivotally disposed on the grip part 33, and the pressing end 92 can be pressed toward the grip part 33 with the pivot end 91 as an axis. When the pressing end 92 is pressed, the power source 40 drives a driving device 50 to rotate. The trigger 90 and the elongated manipulation port 324 are disposed opposite to each other, please refer to FIG. 24, an angle between the trigger 90 and the elongated manipulation port 324 is 180 degrees. When the user holds on the grip part 33, the user is capable of controlling the pushed reversing member 62 with the thumb, and the other four fingers can be placed at a position of the trigger 90 for pressing. Furthermore, there is a manipulating length O between the pressing end 92 and a bottom of the elongated manipulation port 324, and the length O is between 30 mm-80 mm, thereby when the thumb needs to push the pushed reversing member 62 to perform reversing action, the hand does not need to leave an original holding position, that is, the hand does not need to leave the grip part 33 or change a position at which the hand is holding on.

Figure 24:
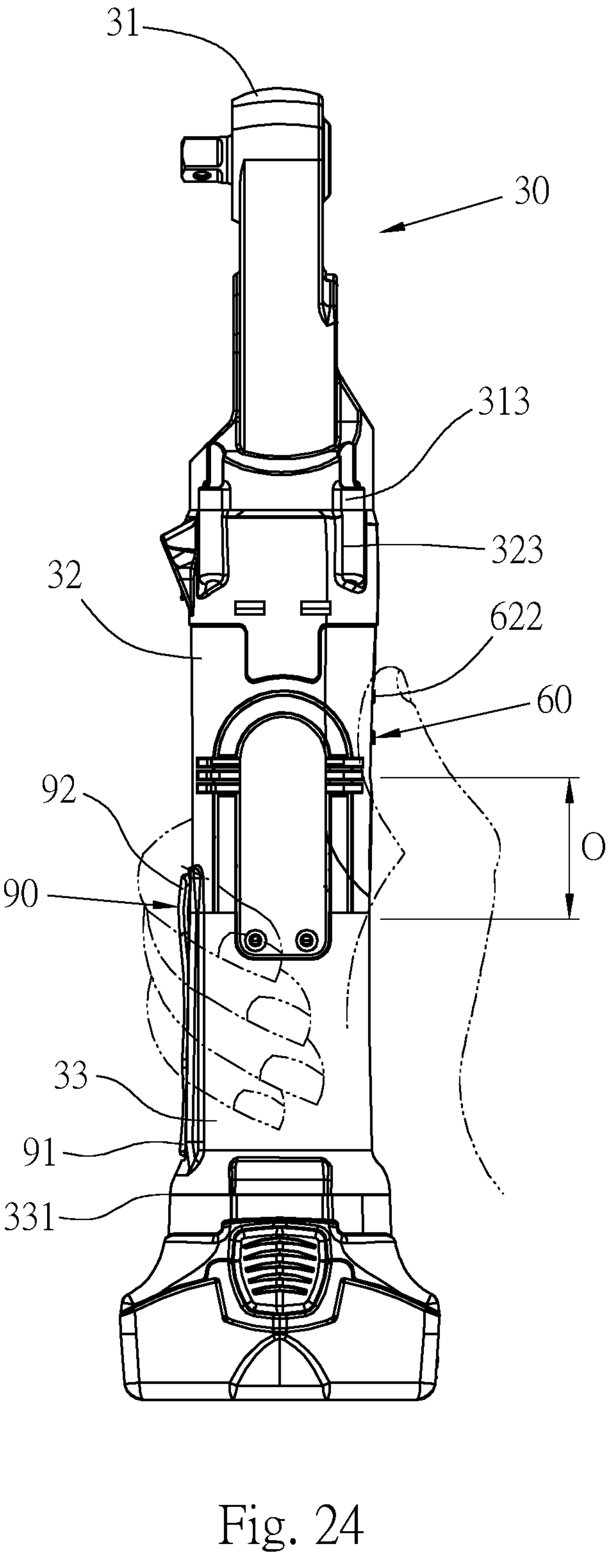
FIG. 24 is a lateral schematic diagram of holding the power tool with a hand to perform manipulation according to the eighth preferred embodiment of the invention.

Please refer to FIGS. 19A and 19C, when the power tool 20 is manipulated, the user's hand will be held on the grip part 33, and the power source 40 can be activated by pressing the pressing end 92 of the trigger 90 with the index finger. Furthermore, please refer to FIG. 24, because a disposed length of the manipulating length O is just enough for the index finger and the thumb to manipulate the pressing end 92 of the trigger 90 and the pushed reversing member 62 respectively, when switching a position of the pushed reversing member 62, the user's hand can still be held at an original position without changing, manipulation is relatively ergonomic and will not cause inconvenience in manipulation. Alternatively, the pushed reversing member 62 can be pushed to switch action while pressing the trigger 90. Please refer to FIGS. 22 to 24, because of disposing of the manipulating length O, when the user's hand is held on the grip part 33, the thumb will be located just near the elongated manipulation port 324, which is convenient for the user to use the thumb to push. When a push block 622 needs to be pushed, the user's hand can be maintained at a position of the grip part 33 in an original manipulation holding state, and the push block 622 is pushed by the thumb of the hand held on the power tool 20. In a process of pushing with the thumb, because the pushing stroke L for reversing also matches a movable distance of the joint of the thumb, it does not need to move a hand position during the pushing process to manipulate. When switching direction, there is no need to move a position of the power tool 20, the power tool 20 can be kept at an original manipulating position. In addition, disposing of the manipulating length O enables the user to adjust a way of gripping with the other four fingers other than the thumb during manipulation according to the user's usual habits. As shown in FIG. 24, all the four fingers are held on the trigger 90, or only the little finger and the ring finger are held on the trigger 90, and the other two fingers are held at a position above the trigger 90, either way of holding can fit a manipulator's habits. In addition, because the elongated manipulation port 324 is disposed on the lower casing 32 and flush with the lower casing 32, and the push block 622 of the pushed reversing member 62 does not protrude from the elongated manipulation port 324, the user will not unintentionally contact with the pushed reversing member 62 to cause a mis-manipulation during manipulation or holding by the user.

In the power tool of the invention, with the manipulation port and the reversing member disposing within the single-handedly holding length between the bottom of the grip part and the manipulation port, the user is capable of holding and performing reversing manipulation with one hand, so that reversing action can be performed through the reversing assembly at a position away from the driving device. Compared with the conventional reversing structure, performing of reversing action in the invention does not require the power tool to be removed from the manipulating position, or does not require the user to remove the hand from the grip part before performing reversing action, or does not require to use both hands at the same time to manipulate.

The above-mentioned embodiments are merely used to illustrate the technical ideas and features of the invention, with an object to enable any person having ordinary skill in the art to understand the technical content of the invention and implement it accordingly, the embodiments are not intended to limit the claims of the invention, and all other equivalent changes and modifications completed based on the technical means disclosed in the invention should be included in the claims covered by the invention.

What is claimed is:

1. A power tool for reversing and holding with a user's single hand, comprising:

a casing provided with an accommodating space therein, a grip part being disposed at a bottom of the casing; an elongated manipulation port being formed in the casing; a single-handedly holding length being disposed between a bottom of the grip part and a central position of the elongated manipulation port, the length being between 100 mm and 160 mm;

a driving device comprising a working head and a control unit; the working head being annularly provided with a ratchet on a circumference thereof; the control unit comprising a swing member, a control member and two driving members; the swing member being capable of swinging back and forth; the control member being pivotally disposed in the swing member, the two driving members being disposed on two sides of the control member respectively; the control member being capable of controlling the two driving members to be away from or close to the working head to control the working head to rotate in different directions;

a power source disposed below the driving device, the power source having an eccentric shaft, the eccentric shaft being capable of driving the swing member to swing;

a reversing assembly having a pushed reversing member slidably disposed in the elongated manipulation port; the pushed reversing member being capable of being reciprocating pushed within the elongated manipulation port to generate positional changes; and a linkage member composed of a rod body; with one end connected with the pushed reversing member, and another end linked with the control member of the control unit; reciprocated displacement change of the pushed reversing member being capable of driving the linkage member, the linkage member being capable of driving the control member to produce a change in displacement, thereby capable of changing a rotation direction of the working head;

wherein, when a thumb of the user is located near the manipulation port, a the user's hand is maintained at a position of the grip part without changing positions;

wherein a maintenance hole is disposed on the casing, a connecting position between the linkage member and the control member is disposed in the maintenance hole, an end cover is covered on the maintenance hole; an area of the maintenance hole is larger than an area of the control member of the driving device;

wherein the end cover is provided with a circular column thereon, the control member is provided with a circular hole; when the end cover is covered on the maintenance hole, the circular column is pivotally disposed in the circular hole; a positioning part is protruded on the end cover, a positioning hole is disposed on the casing, the swing member of the driving device is pivotally disposed on the casing with a pivot shaft that corresponds to the positioning hole, the pivot shaft is recessed with a screw hole; when the end cover is disposed on the maintenance hole, the positioning part is disposed in the positioning hole, and the positioning part is screwed on the screw hole with a screw member, so that the pivot shaft is threadly fixed.

2. The power tool as claimed in claim 1, wherein the grip part further comprises a trigger thereon, the trigger has a pivot end and a pressing end; the pivot end is pivotally disposed on the grip part, and the pressing end is pressed with the pivot end as an axis.

3. The power tool as claimed in claim 2, wherein a manipulating length is between the pressing end of the trigger and a bottom of the elongated manipulation port, and the length is between 30 mm-80 mm.

4. The power tool as claimed in claim 1, wherein the elongated manipulation port is disposed at a peripheral position of the power source.

5. The power tool as claimed in claim 1, wherein the pushed reversing member has a pushing stroke in the elongated manipulation port, and a length of the pushing stroke is 25 mm-50 mm.

* * * * *